(12) United States Patent
Kikugawa et al.

(10) Patent No.: US 10,592,198 B2
(45) Date of Patent: Mar. 17, 2020

(54) AUDIO RECORDING/PLAYBACK DEVICE

(71) Applicant: Toshiba Client Solutions CO., LTD., Koto-ku, Tokyo (JP)

(72) Inventors: Yusaku Kikugawa, Ome Tokyo (JP); Masataka Osada, Kawasaki Kanagawa (JP); Ryuichi Yamaguchi, Ome Tokyo (JP); Hiroto Yoshihara, Narashino Chiba (JP); Hideya Minamiji, Tokyo (JP)

(73) Assignee: Toshiba Client Solutions CO., LTD., Tokyo (JP)

( * ) Notice: Subject to any disclaimer, the term of this patent is extended or adjusted under 35 U.S.C. 154(b) by 214 days.

(21) Appl. No.: 15/389,353

(22) Filed: Dec. 22, 2016

(65) Prior Publication Data
US 2017/0161014 A1      Jun. 8, 2017

Related U.S. Application Data

(63) Continuation of application No. PCT/JP2014/067265, filed on Jun. 27, 2014.

(51) Int. Cl.
*G06F 3/16* (2006.01)
*G10L 15/04* (2013.01)
(Continued)

(52) U.S. Cl.
CPC ............. *G06F 3/165* (2013.01); *G06F 3/167* (2013.01); *G10L 15/04* (2013.01);
(Continued)

(58) Field of Classification Search
CPC .......... G10L 17/22; G06K 9/62; G06K 9/002; G06F 3/048
See application file for complete search history.

(56) References Cited

U.S. PATENT DOCUMENTS

| 8,675,973 B2 | 3/2014 | Hirohata et al. |
| 9,355,683 B2 | 5/2016 | Kim |

(Continued)

FOREIGN PATENT DOCUMENTS

| JP | S61-03242 A | 1/1986 |
| JP | H08-153118 A | 6/1996 |

(Continued)

OTHER PUBLICATIONS

Explanation of Situation for Accelerated Examination filed in a corresponding Japanese application dated Dec. 18, 2015, 6 pages.

(Continued)

*Primary Examiner* — Li P Sun
*Assistant Examiner* — Qi Wan
(74) *Attorney, Agent, or Firm* — Knobbe, Martens, Olson & Bear, LLP

(57) ABSTRACT

According to one embodiment, an electronic device includes a hardware processor configured to display, on a screen, a first bar corresponding to utterance of a first user of a first zone, a second bar corresponding to utterance of a second user of a second zone, and a seek bar corresponding to a zone of a sound included in audio data when the audio data is played back. The hardware processor plays back, when a first position on the seek bar is specified, audio data from a first time point corresponding to the first position.

12 Claims, 14 Drawing Sheets

(51) Int. Cl.
    *G11B 27/10*     (2006.01)
    *G11B 27/34*     (2006.01)
    *G11B 20/10*     (2006.01)
    *G10L 21/12*     (2013.01)

(52) U.S. Cl.
    CPC ...... *G11B 20/10527* (2013.01); *G11B 27/105* (2013.01); *G11B 27/34* (2013.01); *G10L 21/12* (2013.01); *G11B 2020/10546* (2013.01); *G11B 2020/10916* (2013.01)

(56) References Cited

U.S. PATENT DOCUMENTS

| | | | | |
|---|---|---|---|---|
| 2002/0054168 | A1* | 5/2002 | Ohmura | H04N 1/00278 715/854 |
| 2005/0285943 | A1* | 12/2005 | Cutler | G06K 9/00295 348/207.1 |
| 2006/0045470 | A1* | 3/2006 | Poslinski | H04N 5/44513 386/297 |
| 2008/0031595 | A1* | 2/2008 | Cho | G11B 27/34 386/278 |
| 2009/0153289 | A1* | 6/2009 | Hope | G06F 3/04883 340/5.1 |
| 2010/0061197 | A1* | 3/2010 | Yoshikawa | H04M 1/7255 369/1 |
| 2010/0194677 | A1* | 8/2010 | Fiebrink | G06F 3/04847 345/156 |
| 2011/0222785 | A1* | 9/2011 | Hirohata | G06K 9/00288 382/224 |
| 2011/0282662 | A1* | 11/2011 | Aonuma | G10L 17/26 704/231 |
| 2012/0029668 | A1* | 2/2012 | Kim | G11B 27/007 700/94 |
| 2012/0131043 | A1* | 5/2012 | Lee | G06F 17/3084 707/769 |
| 2014/0028617 | A1* | 1/2014 | Kim | G06F 3/1454 345/174 |
| 2014/0164501 | A1* | 6/2014 | Herger | H04N 7/15 709/204 |
| 2015/0019969 | A1* | 1/2015 | Lee | G06F 3/04842 715/719 |
| 2017/0061987 | A1* | 3/2017 | Kikugawa | G06F 3/04883 |

FOREIGN PATENT DOCUMENTS

| | | |
|---|---|---|
| JP | H10-283162 A | 10/1998 |
| JP | 2002-182685 A | 6/2002 |
| JP | 2005-321530 A | 11/2005 |
| JP | 2006-208482 A | 8/2006 |
| JP | 2009-230468 A | 10/2009 |
| JP | 2010-008714 A | 1/2010 |
| JP | 2010-054991 A | 3/2010 |
| JP | 2010-055103 A | 3/2010 |
| JP | 2011-22214 A | 3/2011 |
| JP | 2011-191824 A | 9/2011 |
| JP | 2012-032817 A | 2/2012 |
| JP | 2012-234553 A | 11/2012 |
| JP | 5174068 B2 | 4/2013 |
| JP | 2013-222347 A | 10/2013 |

OTHER PUBLICATIONS

International Search Report dated Jul. 22, 2014 of PCT/JP2014/067265, 5 pages.
Written Opinion dated Jul. 22, 2014 of PCT/JP2014/067265 (JP only), 6 pages.
Japanese Office Action dated Feb. 2, 2016 of corresponding Japanese Patent Application No. 2015-560875 7pages.
Japanese Office Action dated Mar. 15, 2016 of corresponding Japanese Patent Application No. 2015-560875, 6 pages.

* cited by examiner

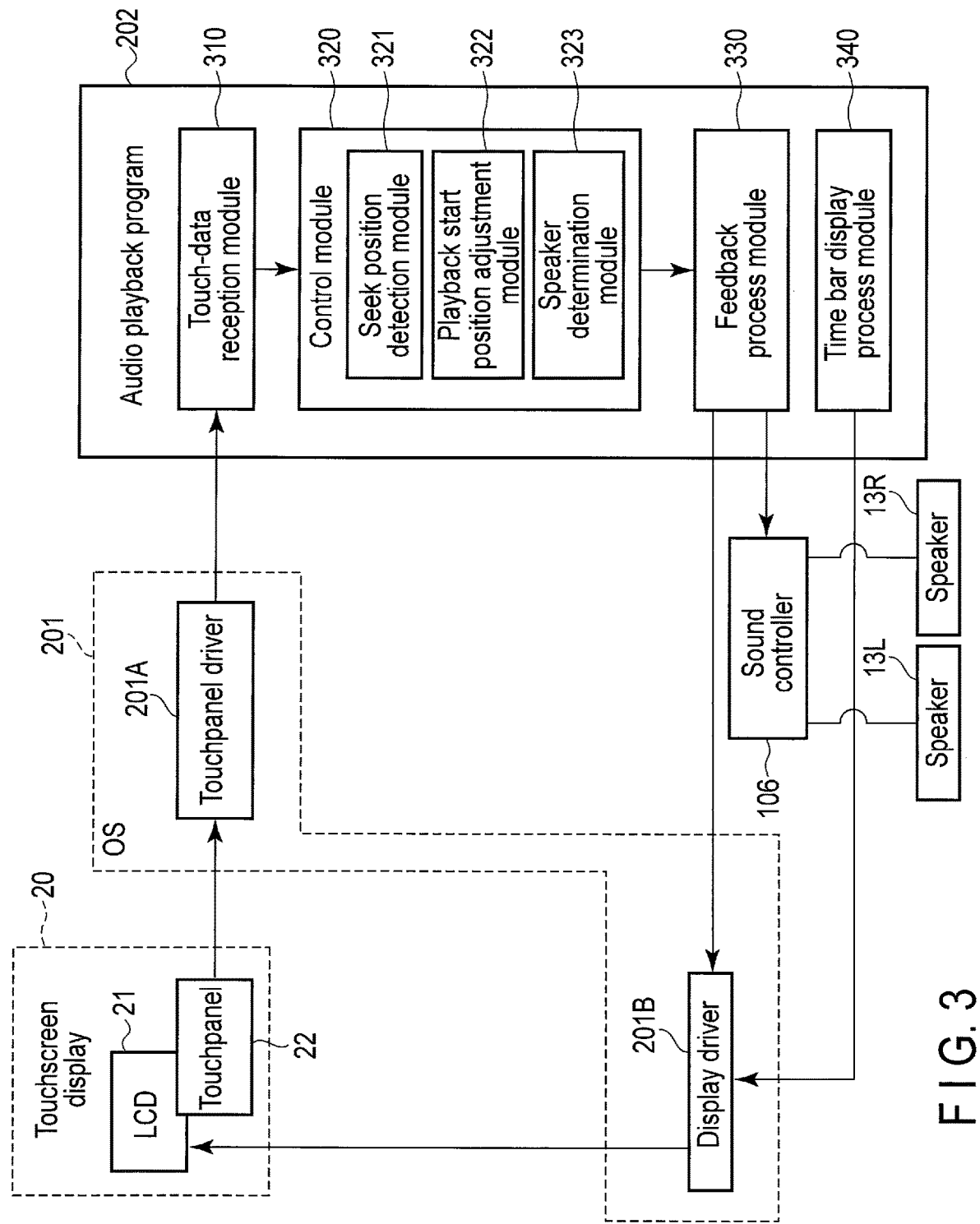
F I G. 3

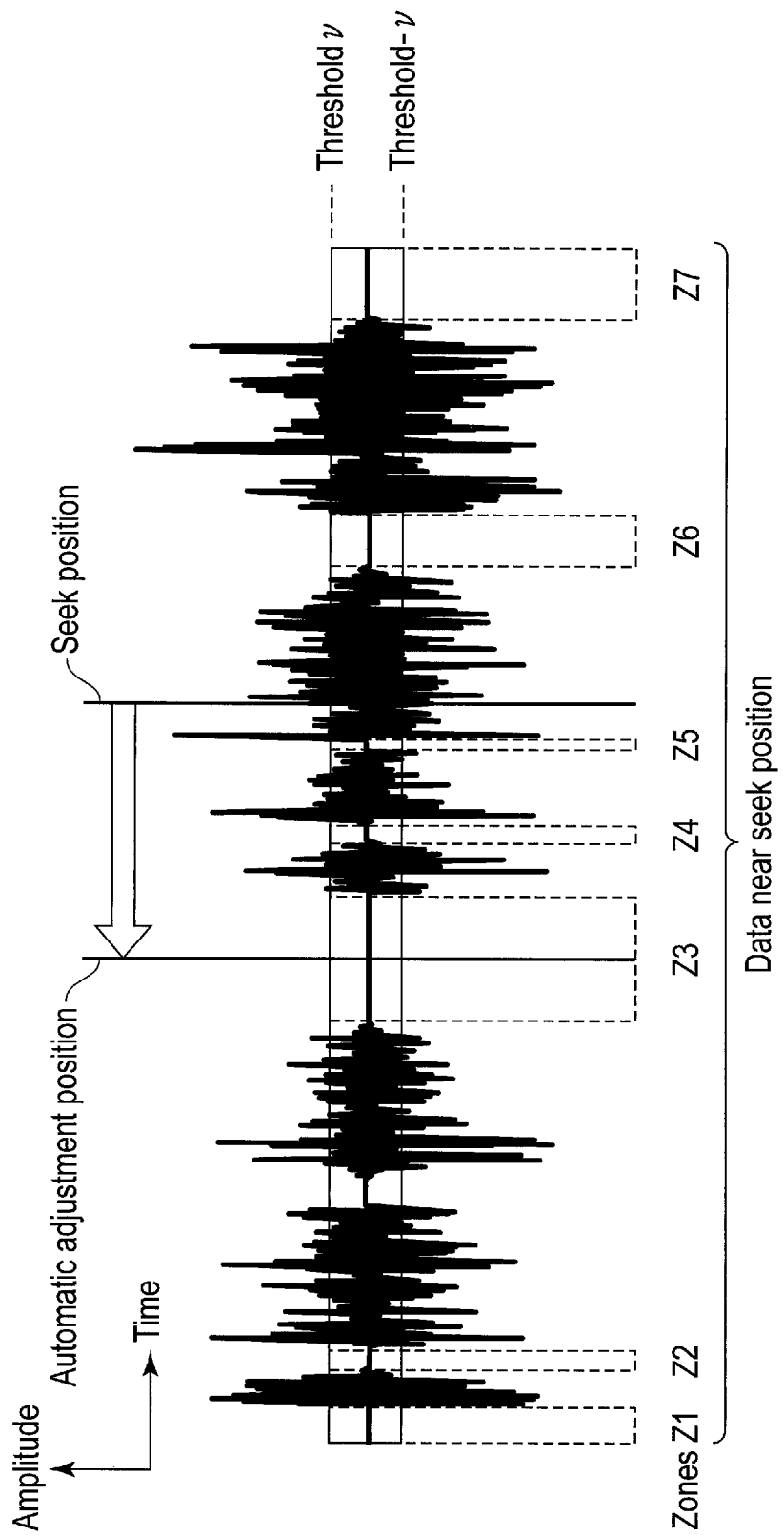
F I G. 7

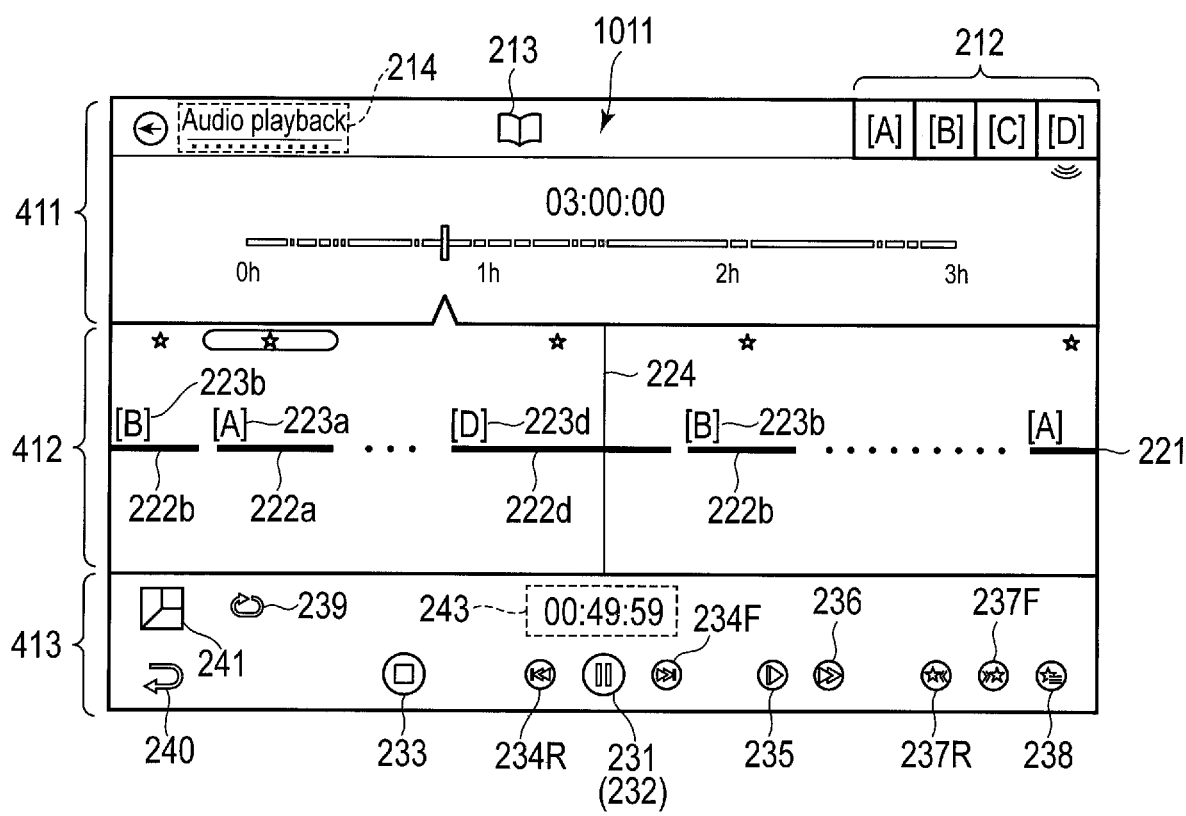
F I G. 10

AUDIO RECORDING/PLAYBACK DEVICE

CROSS REFERENCE TO RELATED APPLICATIONS

This application is a Continuation Application of PCT Application No. PCT/JP2014/067265, filed Jun. 27, 2014, the entire contents of which are incorporated herein by reference.

FIELD

Embodiments described herein relate generally to an electronic device and a method.

BACKGROUND

In electronic devices, an electronic device and a method in which user-friendliness is high are realized.

When the user gives an electronic device an instruction for the audio playback start position, the user may have difficulties in finely adjusting the audio playback start position. Thus, audio may be played back from a position different from the audio playback start position intended by the user. When audio has been played back from a position different from the audio playback start position intended by the user, and the played back audio is conversation or voice of a person, the user may not be able to easily understand the content of the speech from the middle part of the speech.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 shows an example of the hardware configuration of the electronic device according to an embodiment;

FIG. 7 shows an example of the outline of the automatic adjustment of the data playback start position according to an embodiment;

FIG. 10 shows an example of a display example of the screen display of an operation of an audio data display screen in a state where the audio playback program according to an embodiment;

DETAILED DESCRIPTION

Various embodiments will be described hereinafter with reference to the accompanying drawings.

In general, according to one embodiment, an electronic device comprises a screen; a microphone configured to capture sound and produce audio data; and a hardware processor configured to record the audio data in a storage medium; play back the recorded audio data; display, on the screen, when the audio data is recorded and an utterance of a first zone by a first user and an utterance of a second zone by a second user are captured by the microphone, a first bar having a length corresponding to a length of the utterance of the first zone by the first user and a second bar having a length corresponding to a length of the utterance of the second zone by the second user; and display, on the screen, a third bar having a length corresponding to the length of the first zone, a fourth bar having a length corresponding to the length of the second zone, and a seek bar having a length corresponding to a length of a zone of the sound included in the audio data when the audio data is played back. A longitudinal direction of the first bar is identical with a longitudinal direction of the second bar. A longitudinal direction of the third bar, a longitudinal direction of the fourth bar and a longitudinal direction of the seek bar are identical with each other. The hardware processor is configured to play back the recorded audio data from a first time point corresponding to the first position when a first position on the seek bar is specified, display the third bar such that the third bar is distinguished from the first bar, the second bar and the fourth bar when the first bar is selected, and display the fourth bar such that the fourth bar is distinguished from the first bar, the second bar and the third bar when the second bar is selected.

Embodiments will now be described hereinafter in detail with reference to the accompanying drawings.

Figure 1:
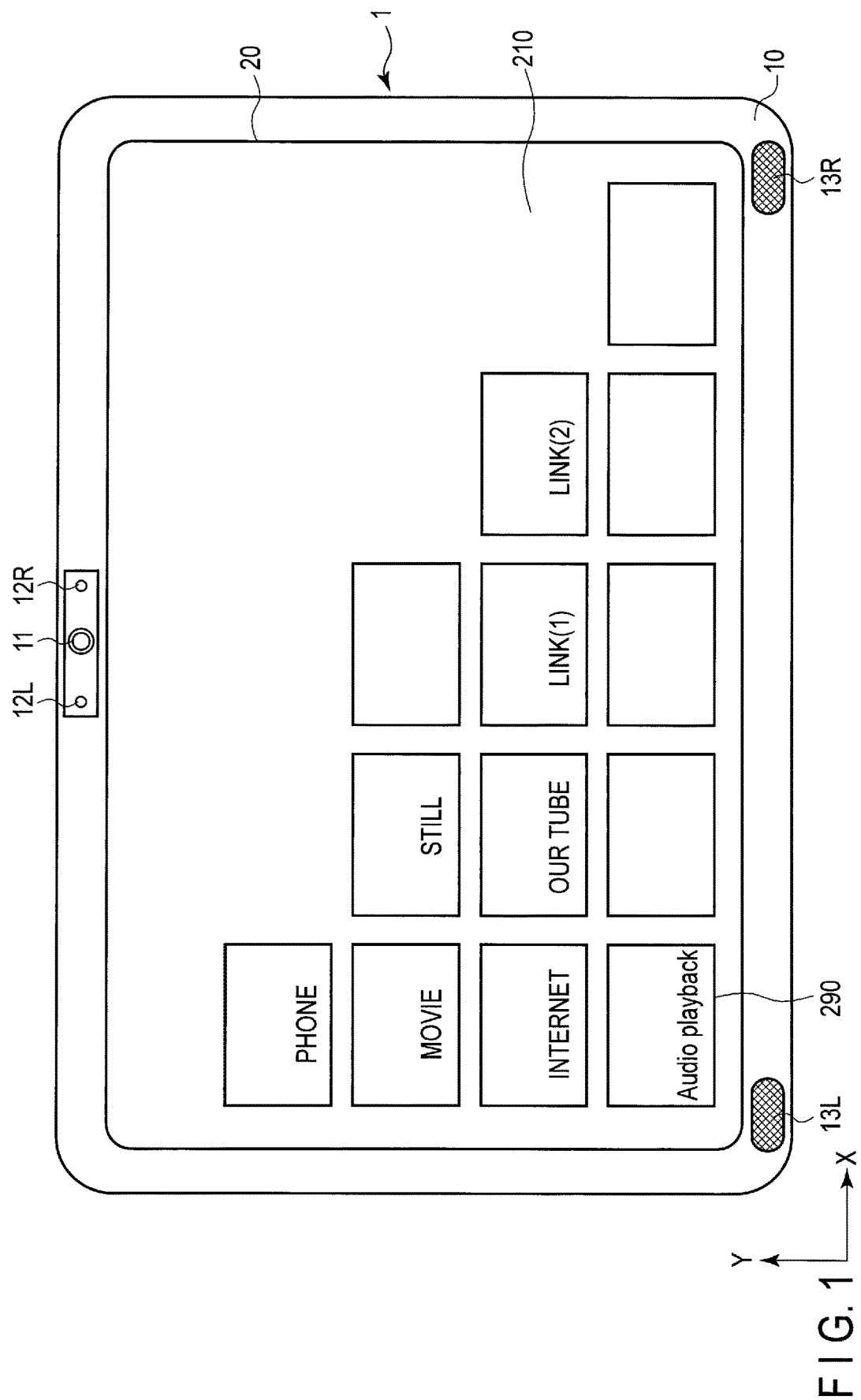
FIG. 1 shows an example of a display example of the display screen of an electronic device according to an embodiment.

FIG. 1 shows an electronic device 1. The electronic device 1 is, for example, a tablet personal computer (portable personal computer [PC]), a smartphone (multifunctional mobile phone device), a personal digital assistant (PDA) (portable terminal device), etc. Hereinafter, a tablet personal computer is explained as the electronic device 1. The elements or structures explained below can be realized by hardware. They can be also realized by software using a microcomputer (a processing unit or a central processing unit [CPU]).

The tablet personal computer (hereinafter, referred to as a tablet terminal device) 1 includes a main body unit (PC main body) 10 and a touchscreen display 20.

A camera unit 11 is located at a predetermined position of the PC main body 10. The camera unit 11 takes, as an image (image data), the data of the capture target facing the touchscreen display 20, such as the user, the user and the background, or an object located around the user. First and second microphones 12R and 12L are located at predetermined positions of the PC main body 10. The first and second microphones 12R and 12L pick up the voice produced by the user or the user and an arbitrary number of people present around the user, and/or the surrounding sound (noise). The first and second microphones 12R and 12L are located such that they are substantially equally distant from the camera unit 11 which is regarded as the virtual center. In the present embodiment, two microphones are provided as an example. However, only one microphone may be provided.

Speakers 13R and 13L are located at predetermined positions of the PC main body 10. Speakers 13R and 13L play back audio data stored in a storage medium of the PC main body 10. A power-on switch (power button), a lock mechanism and an authentication unit are located at predetermined positions of the PC main body 10. The detailed explanation of these elements is omitted here. The power button (power-on switch) controls the power-on/-off for enabling the tablet terminal device 1 to be used (in other words, for activating the tablet terminal device 1), for example. The lock mechanism locks the operation of the power button (power-on switch) while the tablet terminal device 1 is carried, for example. The authentication unit reads data (biometric data) associated with the fingers or palms of the user in order to authenticate the user, for example.

The touchscreen display 20 includes a liquid crystal display (LCD) unit (display unit) 21 and a touchpanel (instruction input acceptance unit) 22. The touchpanel 22 is provided at a predetermined position of the PC main body 10 so as to cover at least the display surface (screen) of the LCD 21.

The touchscreen display 20 detects an instruction input position (a touch position or a contact position) on the display screen in contact with an external object (a stylus or a part of the body of the user such as a finger of a hand). The touchscreen display 20 has (supports) a multi-touch function for detecting a plurality of instruction input positions simultaneously. An external object may be a stylus or a part of the body of the user such as a finger as described above. In the explanation below, a finger of the user is employed as an example.

The touchscreen display 20 is also used as the main display which displays the screens or images (objects) of various application programs in the tablet terminal device 1. When the PC main body 10 is activated, the touchscreen display 20 accepts the start of execution (or the activation) of arbitrary application programs to be activated by the user in accordance with an instruction input through an external object. The touchscreen display 20 displays the icons of the arbitrary number of activated application programs. The orientation of the display screen of the touchscreen display 20 can be switched between lateral orientation (landscape mode) and vertical orientation (portrait mode). FIG. 1 shows an example of the display of the activation completion screen in landscape mode.

Figure 2:
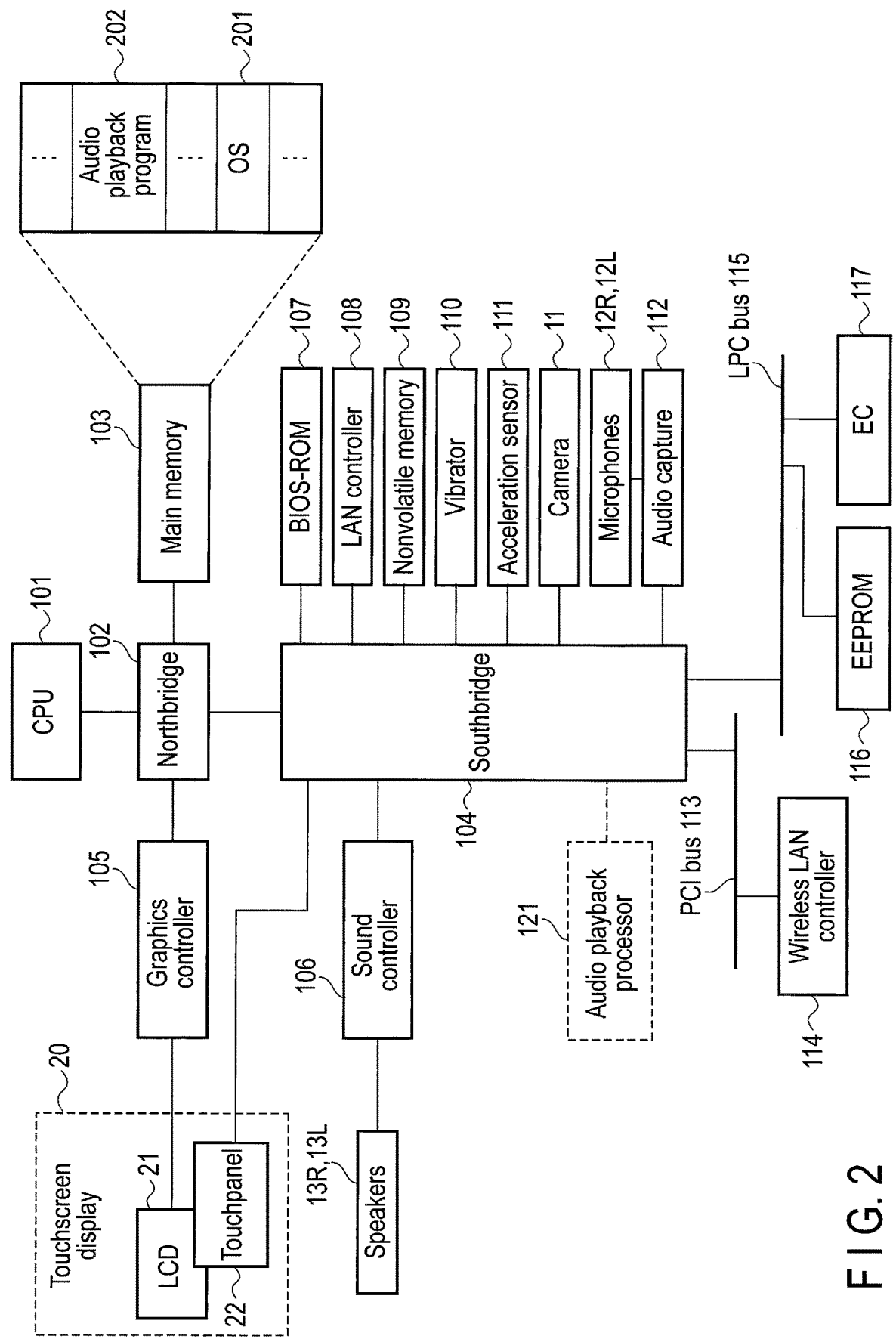
FIG. 2 shows an example of the hardware configuration of the electronic device according to an embodiment.

FIG. 2 shows an example of the system configuration of the tablet terminal device.

The PC main body 10 of the tablet terminal device 1 comprises, for example, a central processing unit (CPU) 101, a northbridge 102, a main memory 103, a southbridge 104, a graphics controller 105, a sound controller 106, a BIOS-ROM 107, a LAN controller 108, a nonvolatile memory 109, a vibrator 110, an acceleration sensor 111, an audio capture (board) 112, a wireless LAN controller 114, an EEPROM 116 and an embedded controller (EC) 117. The nonvolatile memory 109 is an example of the storage medium for storing audio data.

Figure 5:
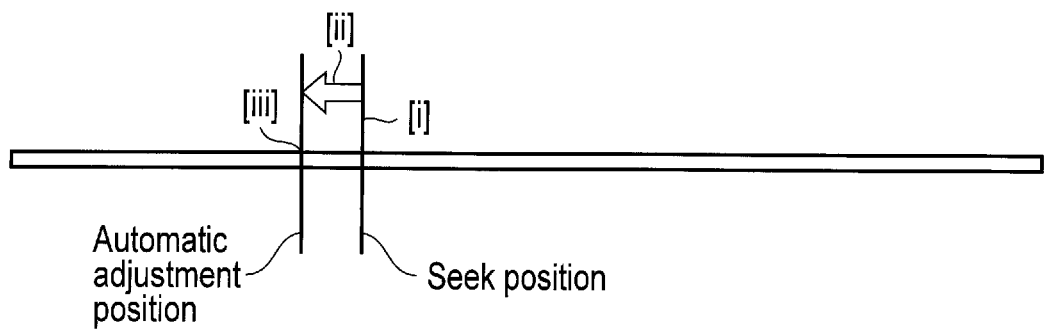
FIG. 5 shows an example of the outline of a user operation (instruction input) for automatically adjusting the data playback start position according to an embodiment.
Figure 6:
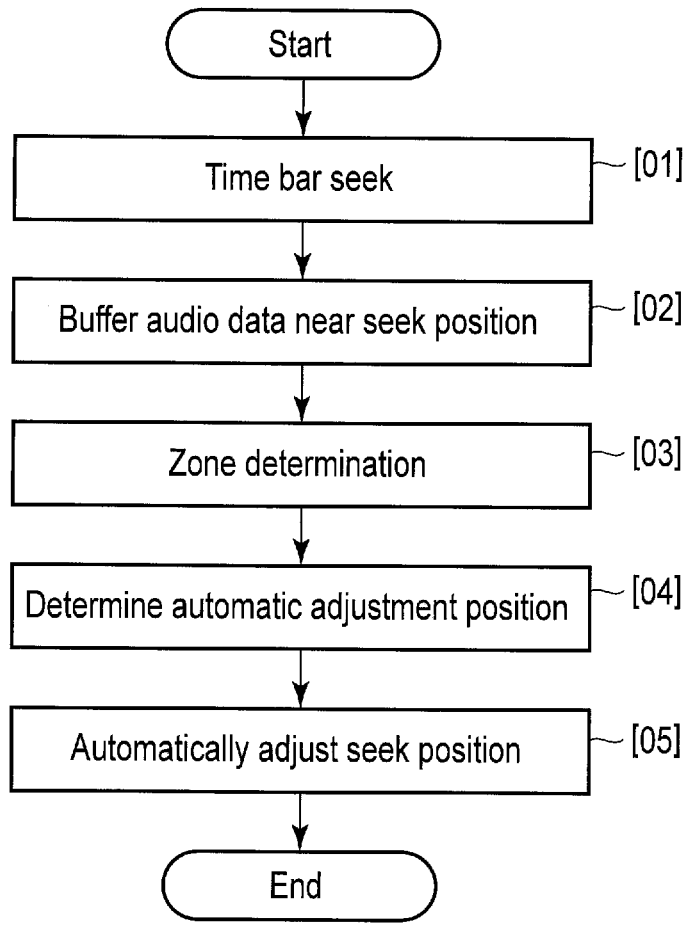
FIG. 6 shows an example of the procedure of the automatic adjustment of the data playback start position according to an embodiment.

The CPU 101 controls the operation of the modules of the PC main body 10 and the touchscreen display 20. The CPU 101 executes an operating system (OS) 201 and various application programs loaded from the nonvolatile memory 109 to the main memory 103. One of the application programs is an audio playback program 202. The outline of the audio playback program 202 is shown in FIG. 5, FIG. 6 and FIG. 7. The audio playback program 202 is software executed in the operating system (OS) 201. The audio playback program 202 may be realized by hardware, using an audio playback processor 121 structured by, for example, a single-chip microcomputer.

The CPU 101 also executes a BIOS stored in the BIOS-ROM 107. The BIOS is a program for hardware control.

The northbridge 102 is a bridge device which connects a local bus of the CPU 101 and the southbridge 104. A memory controller which controls the access to the main memory 103 is incorporated into the northbridge 102. The northbridge 102 has a function for communicating with the graphics controller 105 through a serial bus conforming to the PCI EXPRESS standard, etc.

The graphics controller 105 is a display controller which controls the LCD 21 of the touchscreen display 20 of the PC main body 10. A display signal produced by the graphics controller 105 is transferred to the LCD 21. The LCD 21 displays an image based on the display signal. The touchpanel 22 located on the LCD 21 is a pointing device (user operation instruction input mechanism) for inputting an input signal corresponding to the display on the screen of the LCD 21. The user is able to input a user operation, in other words, an instruction, to the graphical user interface (GUI) displayed on the screen of the LCD 21, etc., through the touchpanel 22. In this manner, the user is able to operate the PC main body 10. By touching an activation icon or a button displayed on the LCD 21 through the touchpanel 22, the user is able to instruct execution of a function corresponding to the activation icon or the button.

The southbridge 104 controls the devices on a peripheral component interconnect (PCI) 113 and the devices on a low pin count (LPC) bus 115. The southbridge 104 comprises a built-in ATA controller for controlling the nonvolatile memory 109.

The southbridge 104 further comprises a built-in USB controller for controlling various USB devices. The southbridge 104 has a function for communicating with the sound controller 106 and the audio capture 112. The image data (moving image/still image) obtained (captured) by the camera 11 is converted into a predetermined format by the camera 11 and is supplied to an image processing program which operates in the main memory 103 through the southbridge 104. Thus, the image data from the camera 11 is played back in the image processing program which is activated in response to a request from the user and which is capable of playing back an image having a format corresponding to the image data from the camera 11. The image data from the camera 11 is displayed on the LCD 21. The image data from the camera 11 can be retained by, for example, the nonvolatile memory 109.

The sound controller 106 is a sound source device. The sound controller 106 converts the audio data to be played back into analog output and outputs the audio data to speakers 13R and 13L.

The LAN controller 108 is, for example, a wired communication device which performs wired communication conforming to the IEEE 802.3 standard.

The vibrator 110 provides the PC main body 10 with vibration depending on the need.

The acceleration sensor 111 detects the rotation of the PC main body 10 for switching the display screen of the touchscreen display 20 between portrait mode and landscape mode, the strength of impact in gesture of a finger of the user, etc.

The audio capture 112 applies analog-to-digital conversion to sound or audio obtained by each of microphone 12R (located on, for example, the right of the camera 11) and microphone 12L (located on the left of the camera 11) and outputs digital signals. The audio capture 112 inputs data indicating which input signal to microphone 12R or 12L has a higher level to the audio playback program 202 operating in the main memory 103 through the southbridge 104. The audio capture 112 is capable of partially or entirely performing a predetermined preparation available in the audio playback program 202.

The wireless LAN controller 114 is, for example, a wireless communication device which performs wireless communication conforming to the IEEE 802.11 standard.

The EC 117 is a single-chip microcomputer including an embedded controller for power management. The EC 117 controls the power-on/-off of the PC main body 10 in accordance with the operation of the power button by the user.

FIG. 3 explains an example of the audio playback program 202.

The audio playback program 202 includes instructions for recording sound, for playing back stored audio and for editing stored audio. The audio playback program 202 comprises at least a touch-data reception module 310, a control module 320, a feedback process module 330 and a time bar display process module 340.

The touch-data reception module 310 receives first coordinate data, second coordinate data and data of the user's finger gesture from the touchpanel 22 via a touchpanel driver 201A in accordance with each user's instruction (each operation of the user's finger). The touch-data reception module 310 outputs the data to the control module 320. The first coordinate data is the coordinate data (x, y) of the contact position which is an arbitrary position on the display surface of the touchpanel 22 in contact with the user's finger. The second coordinate data is the coordinate data (x', y') of the position at which the user's finger is separated from the display surface of the touchpanel 22. The data of the user's finger gesture includes data of the user's finger gesture between the first coordinate data (x, y) and the second coordinate data (x', y'), or data of the user's finger gesture associated with the second coordinate data, for example, data of the direction of separation of the finger.

In the present embodiment, user's operation inputs (in other words, gestures of the user's fingers) are defined as follows.

[1] Touch: A finger of the user is located at a predetermined position on the display surface of the touchpanel 22 for a certain period. (The first coordinate data is substantially the same as the second coordinate data. The finger is separated in a direction substantially perpendicular to the display surface after the elapse of a certain period.)

[2] Tap: A finger of the user is in contact with an arbitrary position on the display surface of the touchpanel 22 for a predetermined period. Subsequently, the finger is separated in a direction perpendicular to the display surface. ("Tap" may be used synonymously with the "touch".)

[3] Swipe: After a finger of the user comes into contact with an arbitrary position on the display surface of the touchpanel 22, the finger moves in an arbitrary direction. (Data of finger's gesture is present between the first coordinate data and the second coordinate data. In other words, the user's finger moves on the display surface so as to trace the display surface.)

[4] Flick: After a finger of the user comes into contact with an arbitrary position on the display surface of the touchpanel 22, the finger moves in an arbitrary direction as if the finger is swept, and the finger is separated from the display surface. (When the user's finger is separated from the display surface in tap, direction data is attached.)

[5] Pinch: After two fingers of the user come into contact with arbitrary positions on the touchpanel 22, the interval between the fingers is changed on the display surface. In particular, when the interval between the fingers is expanded (in other words, when the fingers are separated), the gesture may be called pinch-out. When the interval between the fingers is narrowed (in other words, when the fingers are brought together), the gesture may be called pinch-in.

The control module 320 instructions a program (application) corresponding to the user's gesture (user's instruction input) specified by the data of the above gestures [1] to [5] of the user's finger based on the first coordinate data, the second coordinate data and the data of the user's finger gesture output by the touch-data reception module 310. The control module 320 instructions an application (program) corresponding to the user's instruction input (user input) based on the first coordinate data, the second coordinate data and the data of the user's finger gesture from the touch-data reception module 310 in both of the operation modes explained below, specifically, both a keyboard mode and a mouse mode. In the above explanation, a touch [1] may be a gesture based on a tap [2]. In the present embodiment, when the user moves his/her finger on the display surface of the touchpanel 22 subsequent to touch, the control module 320 instructions for substantially determining that this gesture is a swipe [3]. When the control module 320 instructions for receiving the coordinate data (x', y') of the position from which the user's finger is separated after the move on the touchpanel 22, the control module 320 instructions for determining this gesture as a swipe [3] or a flick [4]. The control module 320 is capable of instructions for calculating the swipe length (in other words, the length of instruction zone) traced (swiped) by the user's finger on the display surface of the touchpanel 22 based on the first coordinate data, the second coordinate data and the data of user's finger gesture from the touchpanel 22. With regard to the length of instruction zone (in other words, the swipe length), the length of zone based on a seek position can be calculated in the editing of audio data as explained later.

In the keyboard mode, in general, the touchscreen display 20 can be used as a virtual keyboard by outputting a character code unique to a corresponding individual key in accordance with the tap through the touchpanel 22 relative to the image of keyboard array displayed on the LCD 21. The mouse mode is an operation mode which outputs relative coordinate data indicating the direction and distance of movement of the contact position on the touchpanel 22 (with a finger) in accordance with the movement of the contact position.

When the user touches an audio playback icon 290 (see FIG. 1) out of predetermined icons (or button displays) displayed on the display surface of the touchpanel 22, the control module 320 instructions an application associated with the audio playback icon 290 corresponding to the coordinate data of the position of the user's finger on the display surface, for example.

The control module 320 instructions, a seek position (user specification position) detection module 321, a playback start position adjustment module 322 and a speaker determination module 323 of the audio playback program 202, for example.

The seek position detection module 321 includes instructions for specifying the seek position based on the first coordinate data, the second coordinate data and the data of a user's finger gesture from the touch-data reception module 310.

The seek position detection module 321 includes instructions for specifying the seek position corresponding to the user's instruction on the time bar display where the axis of time base conforms with the X-axis on the X-Y plane displayed on the LCD 21.

The playback start position adjustment module 322 includes instructions for buffering the audio data near the seek position specified by the seek position detection module 321, includes instructions for detecting a silent zone which is the head of a voice zone near the seek position, and includes instructions for setting the automatic adjustment position used as the playback start position.

The speaker determination module 323 includes instructions for specifying the speaker regarding the neighboring audio data sectionalized by using the silent zone detected by the playback start position adjustment module 322 based on the audio data.

The explanation of details of the methods for determining the speaker is omitted here. Since, specific methods for determining (specifying) the speaker are explained in detail in, for example, JP 2010-055103 A (JP 5174068 B).

The feedback process module 330 instructions for processing a display signal for displaying various types of information within a screen display 210 of the PC main body 10, and instructions for outputting an audio output signal played back by the audio playback program 202. This instructions is explained later in detail with reference to the examples of screen displays shown in FIG. 4, FIG. 8A, FIG. 8B, FIG. 8C and FIG. 9 to FIG. 16.

The feedback process module 330 includes instructions for displaying information within a screen display 210 instructed by a display driver 201B (the graphics controller 105 in FIG. 1) which is incorporated into the OS 201 (and is the firmware of the OS 201), and instructions for changing the output ratio of playback sound output by speaker 13R to that by speaker 13L based on the sound controller 106.

The feedback process module 330 is capable of, relative to the sound controller 106, performing control for changing the output ratio of playback sound output by speaker 13R to that by speaker 13L based on, for example, the position of the speaker corresponding to audio data during playback such that the position of the speaker during recording can be played back in an apparent virtual manner.

The time bar display process module 340 includes instructions for displaying a time bar 211 on image display corresponding to the display surface of the touchpanel 22 on an on-screen display (OSD) basis, to the display driver 201B (the graphics controller 105 in FIG. 1) which is incorporated into the OS 201 (and is the firmware of the OS 201).

Figure 4:
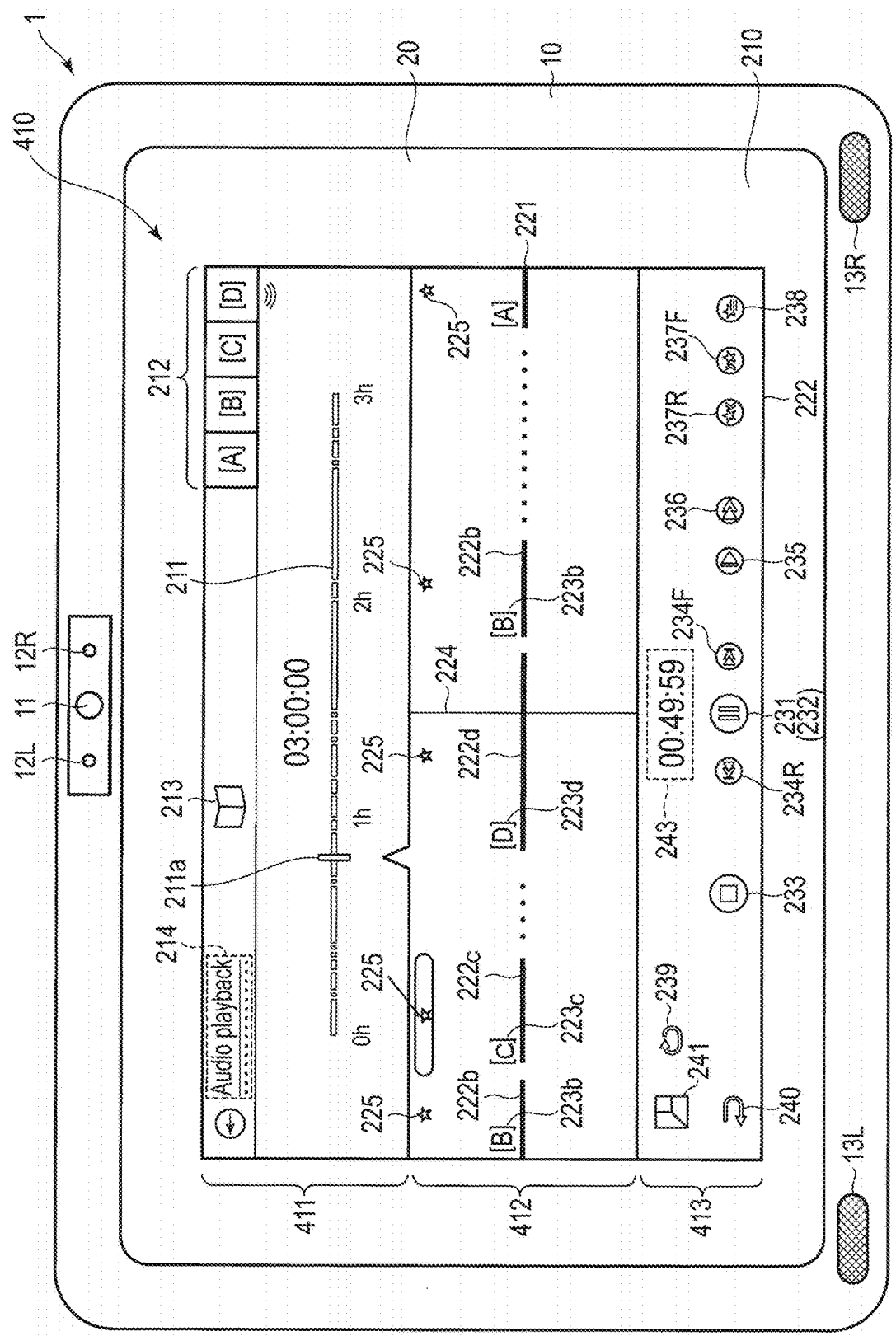
FIG. 4 shows an example of a display example of the screen display of an audio data display screen in a state where the audio playback program according to an embodiment.

FIG. 4 shows a display example of an audio data display screen in a state where the audio playback program 202 is activated. The display example shown in FIG. 4 is an example which is displayed at the time of playing back audio data recorded by the audio playback program 202.

An audio data display screen 410 which is displayed within the screen display 210 of the PC main body 10 when the audio playback program 202 is operated includes three broad display areas into which the screen is sectionalized vertically. The three display areas are a first display area 411, a second display area 412 and a third display area 413. The first display area 411 is also called, for example, the field of record name, recognized speaker/full view and status in association with the status or information to be displayed. The second display area 412 is also called, for example, the field of large view or status in consideration of the content of the status or information to be displayed. The third display area 413 is also called, for example, the field of control in association with the status or information to be displayed.

The first display area 411 displays the time bar 211 indicating the whole part of audio content (audio data) which is played back in progress (or the whole part of audio content to be played back), and a locator (audio playback position display) 211a indicating the current playback position of audio content or the start position of audio playback instructed by the user. The locator 211a is located at a position at which the playback time (elapsed time) from the head of the content is proportionally distributed relative to the total time indicated by the time bar 211.

The first display area 411 includes, for example, a speaker display area 212 for displaying each of the specified speakers and a list display button 213 for displaying a list. The first display area 411 further includes a record field 214 for displaying the record name.

The speaker display area 212 is displayed up to ten specified speakers by the alphabet, for example, [A] to [J], when the content is played back. (In the example of FIG. 4, four speakers [A] to [D] are displayed.) The speaker display area 212 is also displayed the speaker who is currently speaking by an utterance mark 215.

The second display area 412 includes, for example, a playback position display field 221 for displaying the playback position (time) of audio content (audio data), utterance bars 222a, 222b, . . . , 222n (n is a positive integer), speaker identifiers 223a, 223b, . . . , 223n (n is a positive integer), a current position mark (line) 224 and a marking identifier (star mark) 225.

When audio content is played back, the playback position display field 221 displays the time (audio data) which was played back on the left side of the current position mark (line), and the time (audio data) which will be played back on the right side of the current position mark (line).

Utterance bars 222*a*, 222*b*, . . . , 222*n* display the utterance of each speaker, in other words, the length (time) of audio data of each speaker, in association with the speaker in the playback position display field 221. Thus, speaker identifiers 223*a*, 223*b*, . . . , 223*n* (n is a positive integer) are integrally attached to utterance bars 222*a*, 222*b*, . . . , 222*n*. The current position mark (line) 224 indicates the current position (time) in the playback position display field 221. The audio data of each speaker for playback can be selected by applying a swipe operation to utterance bars 222*a*, 222*b*, . . . , 222*n*. The number of speaker zones (utterance bars) to be skipped can be changed by changing the strength (speed/pressure) of a swipe (finger move), in other words, by changing the speed or pressure when the user moves his/her finger on the display surface.

The marking identifier (star mark) 225 is displayed near substantially the central portion of the utterance bar 223 (223*a* to 223*n*) of each speaker in the length (time) direction. Each utterance can be marked by tapping the vicinity of the star mark 225.

The third display area 413 includes, for example, a pause button 231/a play button 232, a stop button 233, a skip (forward) button 234F, a skip (backward) button 234R, a slow-speed play button 235, a high-speed play button 236, a star mark skip (forward) button 237F, a star mark skip (backward) button 237R, a marking identifier (star mark) list display button 238, a repeat button 239 and a return button 240. The third display area 413 includes a display switch button 241 which allows the user to input an instruction for switching the display style of the screen display 210 with the snap view screen described later.

The pause button 231 and the play button 232 are toggle buttons which are displayed alternately. By touching or tapping the play button 232, the playback of the selected audio data (content) is started. In a state where content is played back by the play button 232, the pause button 231 is displayed. When the pause button 231 is touched or tapped, the playback of content is temporarily stopped, and the play button 232 is displayed.

The stop button 233 is used to stop the playback of content during playback or pause, or stop the playback of the content by canceling the pause.

By touching or tapping the skip (forward) button 234F or the skip (backward) button 234R, one utterance bar (222*a*, 222*b*, . . . , 222*n*) is skipped. When the skip (forward) button 234F is touched or tapped, one utterance bar (222*a*, 222*b*, . . . , 222*n*) is skipped in the playback position display field 221 in the right direction on the screen display 210; in other words, one audio data item (utterance bar) which will be played back is skipped. When the skip (backward) button 234R is touched or tapped, one utterance bar (222*a*, 222*b*, . . . , 222*n*) is skipped in the playback position display field 221 in the left direction on the screen display 210; in other words, one audio data item (utterance bar) which was played back is skipped. When the skip button display is tapped, it is possible to input a control command for enabling the skip of each utterance. Skip can be performed only for each utterance. (When skip is performed, the current position is jumped to the head of the next group of sounds).

The slow-speed play button 235 applies slow-speed playback of, for example, 0.5 times or 0.75 times slower than normal, to the utterance which is currently played back.

When the slow-speed play button is tapped, for example, playback of 0.75 (¾) times slower than normal, playback of 0.5 (½) times slower than normal, and normal playback are repeated in order.

The high-speed play button 236 applies high-speed playback of, for example, 1.25 times, 1.5 times, 1.75 times or twice as fast as normal, to the utterance which is currently played back. When the high-speed play button is tapped, for example, playback of 1.25 (5/4) times as fast as normal, playback of 1.5 (3/2) times as fast as normal, playback of twice as fast as normal, and normal playback are repeated in order. In either case of slow-speed playback or high-speed playback, the status (for example, playback of X-times slower/faster) is preferably displayed in a predetermined display area.

The star mark skip (forward skip) button 237F and the star mark skip (backward skip) button 237R allow skip of one utterance bar provided with the marking identifier (star mark) 225. When the star mark skip (forward skip) button 237F is touched or tapped, out of utterance bars provided with the star marks 225, one audio data item (utterance bar) is skipped in the playback position display field 221 in the right direction within the screen display 210. In other words, one audio data item (utterance bar) which will be played back is skipped. When the star mark skip (backward skip) button 237R is touched or tapped, out of utterance bars provided with the star marks 225, one audio data item (utterance bar) is skipped in the playback position display field 221 in the left direction within the screen display 210. In other words, one audio data item (utterance bar) which was played back is skipped.

The marking identifier (star mark) list display button 238 is used to display all of the utterance bars provided with the star marks 225 as a file list display 251 provided with the star marks in a pop-up manner. This display is explained later with reference to FIG. 12.

The repeat button 239 applies repeat playback to audio data corresponding to the utterance bar which is currently played back.

The return button 240 is used to input, to the southbridge 104, a control signal for returning to the operation state which is one state before the current state.

Figure 11:
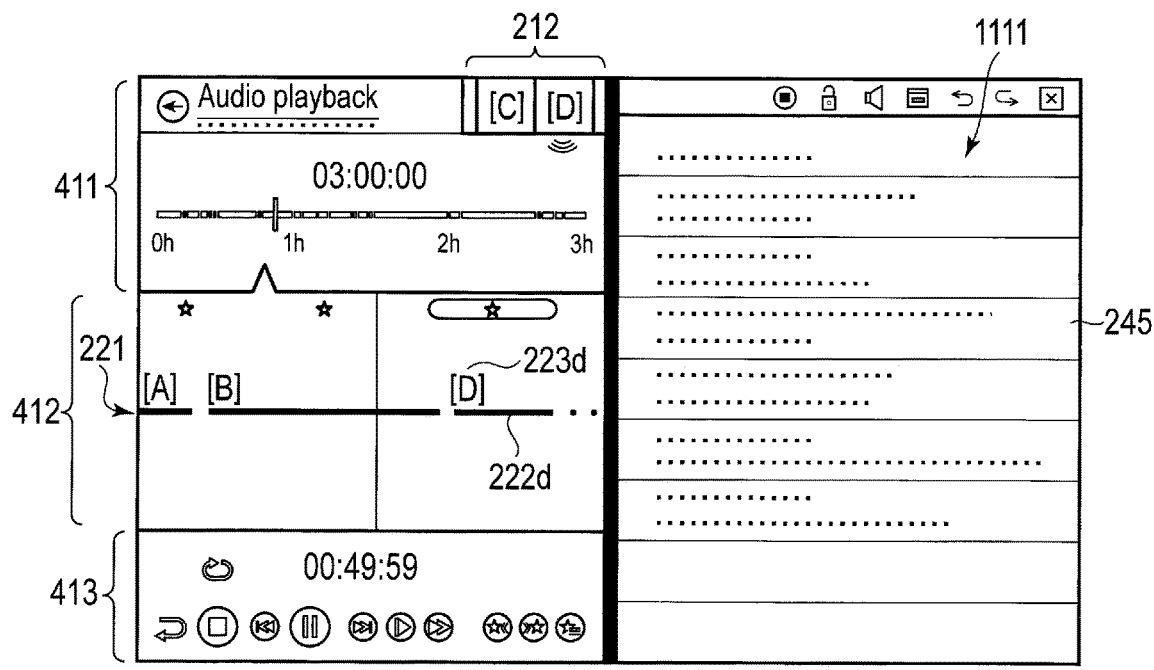
FIG. 11 shows an example of a display example of the screen display of an operation of an audio data display screen in a state where the audio playback program according to an embodiment.

The display switch button 241 is used to input display switch for switching the display style of the screen display 210 with the snap view screen (shown in FIG. 11).

On the screen display 210 shown in FIG. 4, the user brings his/her finger into contact with the locator 211*a*, swipes in the direction of the axis of time base of the time bar 211 and separates the finger at an arbitrary position. In this manner, the automatic adjustment position explained below under the control of the playback start position adjustment module 322 explained with reference to FIG. 3, is started.

Various displays which are shown in FIG. 4 and described above are applied on the LCD 21 under the control of the feedback process module 330 explained with reference to FIG. 3. With regard to various display signals output by the feedback process module 330, an image signal (display signal) is preferably output for displaying speaker identifiers 223*a*, 223*b*, . . . , 223*n* in the display field 221 which displays speakers such that the speaker who is currently played back can be specified. Alternatively, a display signal is preferably output by the feedback process module 330 such that the background color of the display of speaker identifiers 223*a*, 223*b*, . . . , 223*n* corresponding to the speaker who is currently played back in the display field 221 of the playback position of audio data is changed. This allows the user to easily and visually identify each speaker. Alternatively, the feedback process module 330 preferably outputs an image signal (display signal) which enables an arbitrary display; for example, the brightness of the display of the identifier of the speaker may be changed, or the display may be blinked.

The feedback process module 330 preferably outputs an image signal (display signal) such that, for example, the display color of the identifier of each speaker in the display field 221 of the playback position (time) of audio data (in other words, the second display area 412) is the same as that in the speaker display area 212.

In FIG. 4, the time bar 211 displays the content which is played back in progress from the head position (00 hours and 00 minute) to the end position (hh hours and mm minutes) with a predetermined length in the display area of the LCD 21 of the touchscreen display 20. The locator 211a displays the elapsed time (elapsed state) from the head position to the current playback position of the content during playback at a position from the head position of the content where the entire length of the time bar 211 is proportionally distributed on the time bar 211. Thus, the amount of movement of the locator 211a depends on the entire length of the time bar 211, in other words, the total time of the content during playback. When the user seeks the playback position of the content which is currently played back by moving the locator 211a on the time bar 211 for playback, the audio playback program 202 is capable of automatically adjusting the start position of audio playback to a predetermined position near the position specified by the user.

On the screen display 210 shown in FIG. 4, only touch and drag gestures can be made for the information or status displayed in the first display area 411. A swipe gesture can be made to input an instruction for the information or status displayed in the second display area 412. The audio playback program 202 is capable of operating audio data through a swipe. At this time, the number of speaker zones to be skipped can be changed based on the strength of the swipe.

Now, this specification explains the automatic adjustment of the playback start position when audio data is played back by the audio playback program 202. An example of the operation of the control module 320 is explained, assuming that the audio playback program 202 is instructed by the audio playback icon 290 shown in FIG. 1, and an execution instruction is input to the audio playback program 202. The audio playback program 202 includes instructions for recording sound and playing back stored audio. The instruction for recording sound is explained later. Firstly, this specification explains a method for playing back audio data.

FIG. 5 shows the concept of automatic adjustment for automatically adjusting the playback start position in audio playback.

The user moves (swipes with) the locator 211a on the time bar 211 shown in FIG. 4 and separates the finger from the touchpanel 22 at an arbitrary position. In this manner, the seek position for starting in audio playback is determined [i]. The seek position is specified by the seek position detection module 321 shown in FIG. 3.

Subsequently, the audio data near the seek position is buffered to detect a silent zone which is the head of a voice zone near the seek position [ii]. Thus, the automatic adjustment position used as the playback start position is set [iii]. In short, the playback start position in the audio playback program 202 is automatically adjusted. As stated above, the playback start position is automatically adjusted by the playback start position adjustment module 322.

With reference to FIG. 6, this specification explains the automatic adjustment of the playback start position shown in FIG. 5 in terms of software, executed by the tablet terminal device 1 will be described. As described above, the CPU 101 in the tablet terminal device 1 executes the instructions included in the audio playback program 202. The time bar 211 and the locator 211a correspond to the display example shown in FIG. 4.

Firstly, the position to which the user moved the locator 211a on the time bar 211 is temporarily stored as the seek position (as the position specified by the user) [block 01].

Subsequently, audio data near the audio data of the seek position is buffered [block 02].

Subsequently, with regard to the buffered audio data, a range in which the amplitude is less than the absolute value of a threshold $\gamma$ is determined as a silent zone (silent period) [block 03].

Subsequently, with regard to the audio data determined as silent zones, from which silent zone playback should be started is determined (specified). Further, from which position in the silent zone playback should be started is determined (specified) [block 04].

Thus, automatic adjustment is performed, considering the specified silent zone (position) as the playback start position [block 05].

FIG. 7 more specifically shows the automatic adjustment of the playback start position shown in FIG. 6.

From the seek position specified by the user operation, the head of audio data (a group of sounds) before (in other words, earlier than) at least the seek position on the axis of time base is detected. A group of sounds refers to a section which can be defined by silent zones described later out of the utterance (voice production) of an arbitrary speaker. A group of sounds may be based on, for example, the switch of scenes in a conversation or meeting among a plurality of users, a musical performance or a television program (content).

To detect the head of audio data, firstly, a predetermined period of audio data which includes a temporal change before and after the seek position is buffered such that the seek position is substantially the middle point.

Subsequently, with regard to the buffered audio data, a range in which the amplitude is less than the absolute value of a threshold $\gamma$, in other words, less than the range between a threshold $\gamma$ and a threshold $-\gamma$, is determined as a silent zone (silent period).

With regard to the audio data determined as silent, silent zones Zs (s=1, 2, 3, . . . , n; n is a positive integer) are estimated by counting the successive number. (In other words, one or more sections are specified.) Lastly, the playback start position is automatically adjusted to the position of one of silent zones Zs.

With regard to which silent zone Zs should be selected (in other words, what number of zone should be played back), the zone closest to the seek position may be selected, or the zone having the longest silent zone may be selected. Apart from the above, the optimal value of switch in conversation (in other words, the length of a silent zone) may be evaluated in advance. The section having a silent zone having a length closest to the evaluated length may be determined as the playback start position. The length of a silent zone is preferably, for example, 3 to 4 seconds, 2 to 3 seconds or 1 to 2 seconds. The specific position for seek in the silent zone (in other words, the specific position for the playback start position in the silent zone) may be any position such as the middle, end or head of the silent zone.

Now, this specification explains the playback of stored audio, the recording of sound and the setting before recording by the audio playback program 202 with reference to display examples of the screen display 210 of the display surface of the touchpanel 22 of the PC main body 10.

From the screen displays of a before-recording screen display 210-1 (FIG. 8A), a recording-in-progress screen display 210-2 (FIG. 8B) and a playback-in-progress screen display 210-3 (FIG. 8C) which are included in the audio playback program 202, the playback-in-progress screen display explained in FIG. 4 is equivalent to the playback-in-progress screen display 210-3 (FIG. 8C) which is applied corresponding to a user operation (instruction input). The screen display which is performed when the audio playback program 202 is operated is explained in association with enlarged displays or exemplary displays for explanation with reference to FIG. 9 to FIG. 16.

Figure 8A:
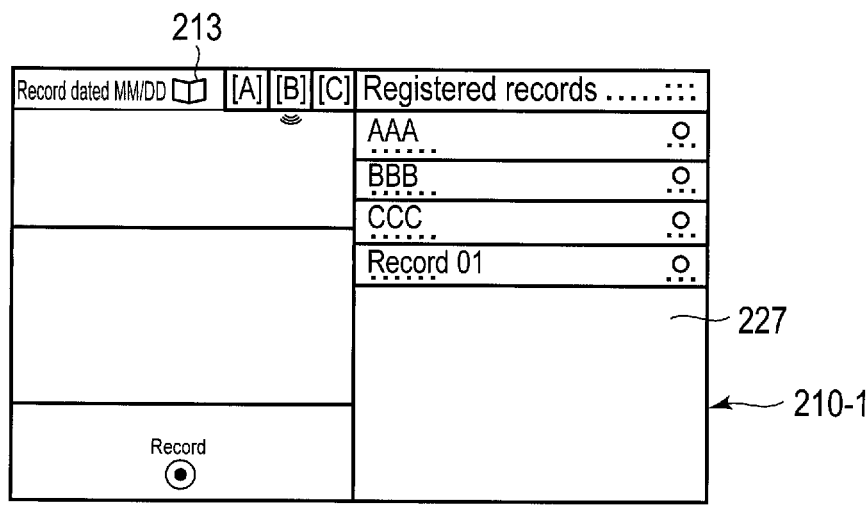
FIG. 8A shows an example of a display example of the screen display of a before-recording according to an embodiment.
Figure 8B:
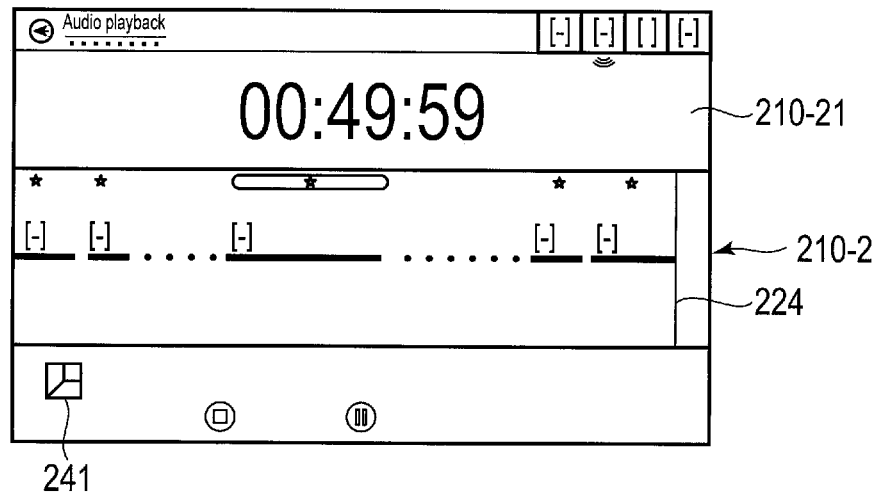
FIG. 8B shows an example of a display example of the screen display of a recording-in-progress according to an embodiment.
Figure 8C:
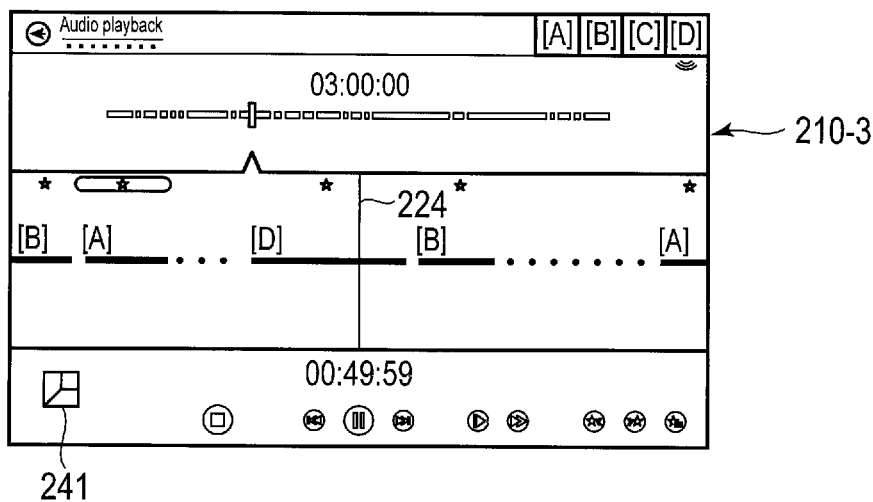
FIG. 8C shows an example of a display example of the screen display of a playback-in-progress according to an embodiment.

The before-recording screen display 210-1, the recording-in-progress screen display 210-2 and the playback-in-progress screen display 210-3 which are shown in FIG. 8A, FIG. 8B and FIG. 8C as examples and are included in the audio playback program 202 are transitioned in accordance with each user operation (instruction input). FIG. 8A, FIG. 8B, FIG. 8C and FIG. 9 to FIG. 16, each shows a screen display example. It is obvious that the touchpanel 22 controls input corresponding to the screen display applied on the LCD 21.

Figure 9:
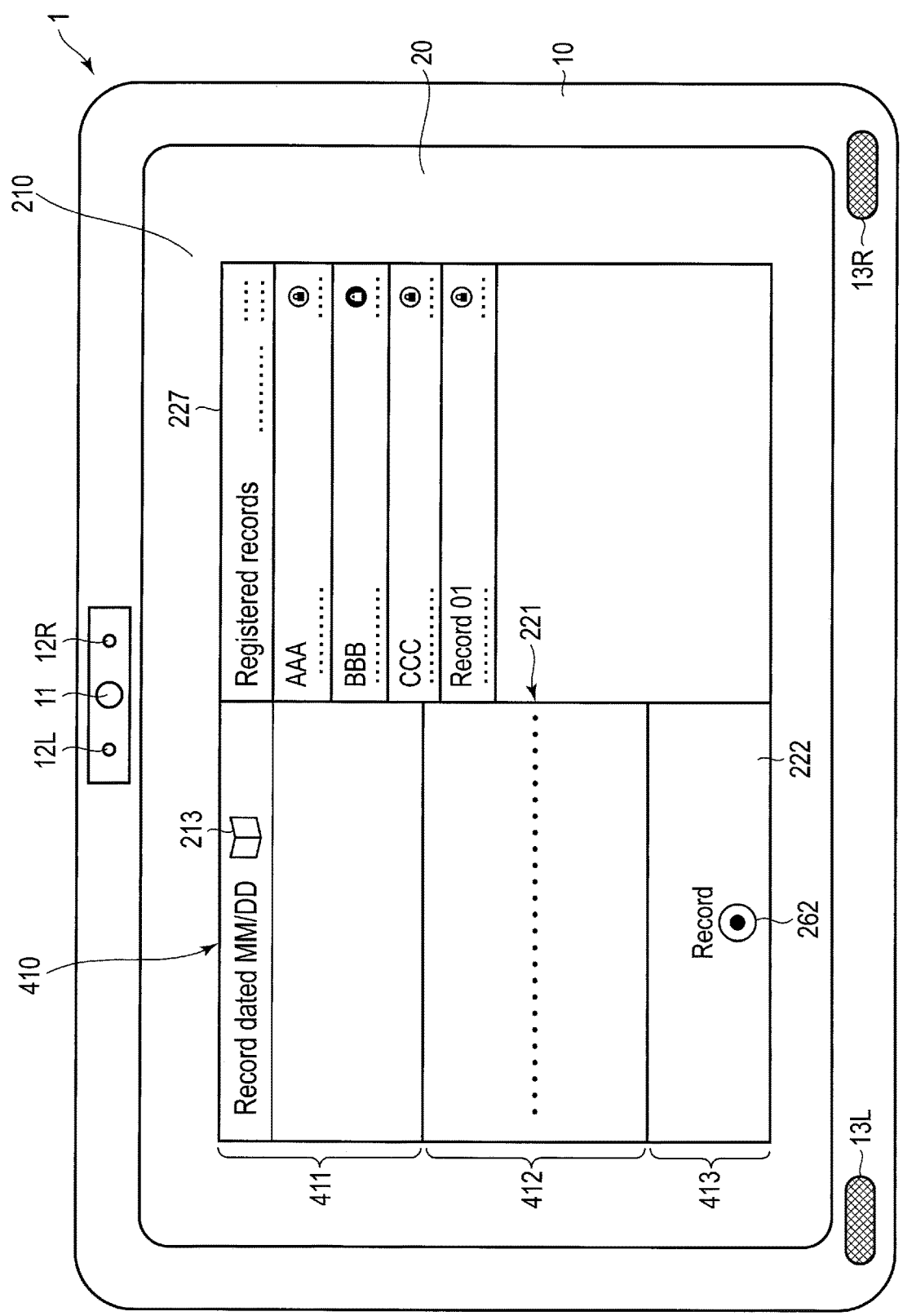
FIG. 9 shows an example of a display example of the screen display of an operation of an audio data display screen in a state where the audio playback program according to an embodiment.

The before-recording screen display 210-1 shown in FIG. 8A includes, for example, an index portion display 227 in one of two right and left split displays of the screen display 210-1. FIG. 9 shows an enlarged screen display example.

The index portion display 227 of the before-recording screen display 210-1 in FIG. 8A and FIG. 9 displays the names of records which have been stored and registered.

The playback-in-progress screen display 210-3 shown in FIG. 8C and a screen display 1011 shown in FIG. 10 are substantially the same as the display example explained with reference to FIG. 4. Thus, the detailed explanation is omitted. The first display area 411 includes the time bar 211 and the locator 211a. The second display area 412 includes, for example, the playback position display field 221 for displaying the playback position (time) of audio content (audio data), utterance bars 222a, 222b, . . . , 222n, speaker identifiers 223a, 223b, . . . , 223n, the current position mark (line) 224 and the marking identifier (star mark) 225. The third display area 413 includes, for example, the pause button 231/play button 232, the stop button 233, the skip (forward) button 234F, the skip (backward) button 234R, the slow-speed play button 235, the high-speed play button 236, the star mark skip (forward) button 237F, the star mark skip (backward skip) button 237R, the marking identifier (star mark) list display button 238, the repeat button 239 and the return button 240. The third display area 413 further includes the display switch button 241 which allows the user to input an instruction for switching the display style of the screen display 210 with the snap view screen described later.

When the display switch button 241 is touched or tapped, as shown in a screen display 1111 of FIG. 11, the first display area 411 to the third display area 413 are displayed in one of two right and left split displays of the screen display 1111. A snap view screen 245 is displayed at which a remaining the one of the right and left split display of the screen display 1111. The snap view screen 245 displays the start time and end time of each utterance bar of the specified individual speakers in order.

In FIG. 9, FIG. 10 or FIG. 11, for example, when an arbitrary position is tapped in the first display area (the field of record name, recognized speakers/entire view and status) 411, a control command for executing the playback of audio data near the playback time corresponding to the tapped position can be input to the CPU 101 of the PC main body 10.

When the display of an arbitrary position is dragged in the second display area (the field of enlarged view and status) 412, it is possible to control the display and change (set) the playback position in the substantially same manner as a seek operation. To show the speaker identification, the display color of only the selected speaker can be changed. Even when the speech (utterance) is short, the display can be performed such that the speaker is specified with the least number of pixels. Moreover, it is possible to perform a time display 243 near the central bottom part of the second display area 412 such as the playback time of the utterance during playback (a group of sounds), the total time of speeches, or the total time of speeches of the same speaker for each speaker.

In the enlarged view (second display area) 412, a control command for finely adjusting the playback position can be input by dragging the whole enlarged part laterally.

For example, when the enlarged display part is scrolled through a flick or swipe in the enlarged view, the playback start position of audio data is automatically adjusted (snapped) to the head of utterance (audio data) by the execution and operation of the audio playback program 202. Scrolling is preferably a display (an operation) having inertia.

On the screen display 1111 shown in FIG. 11, the display width of each of the first display area 411 to the third display area 413 is reduced because of the snap view screen display 245 is displayed. For example, when the number of speakers to be displayed in the speaker display area 212 is not fitted into the display area, it is possible to use a ticker display which cuts a part of the speakers in order to prompt scrolling (a ticker method, which passes a character string through a specific range (or sequentially changes the display position of a character in one direction) in display).

Figure 12:
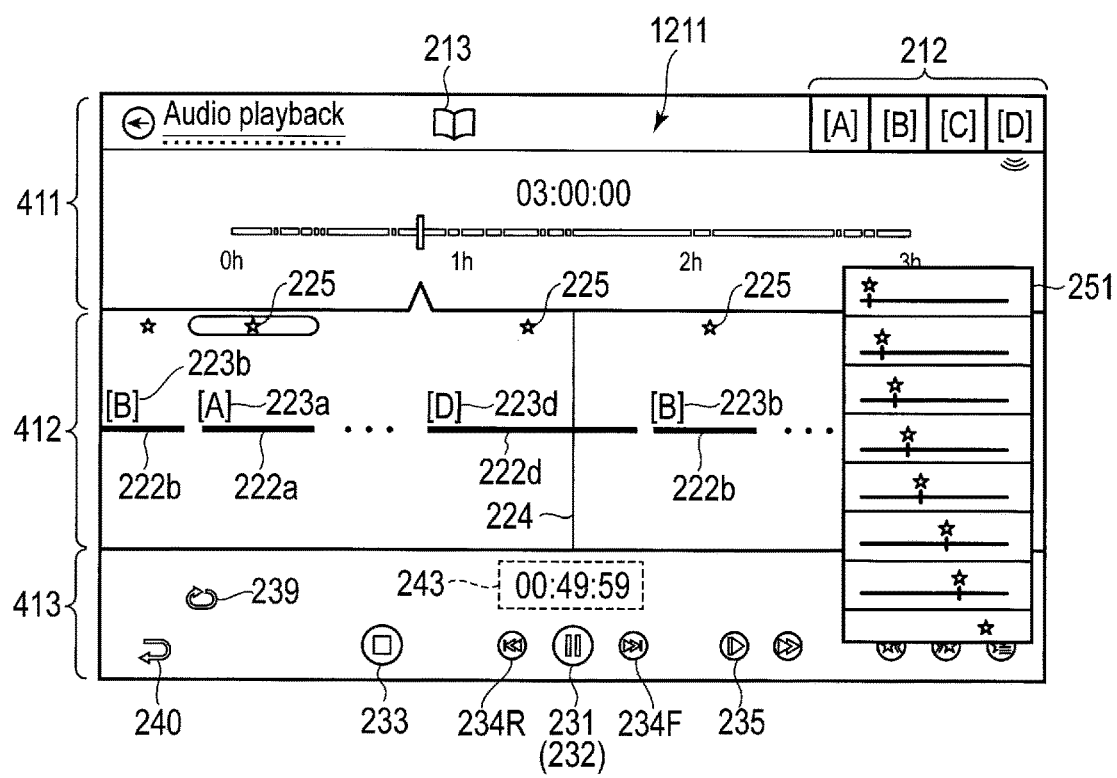
FIG. 12 shows an example of a display example of the screen display of an operation of an audio data display screen in a state where the audio playback program according to an embodiment.

FIG. 12 is a display example in which all of the utterance bars provided with the star marks (marking identifiers) 225 are displayed as the file list display 251 provided with the star marks in a pop-up manner by touching or tapping the marking identifier (star mark) list display button 238. By touching or tapping the star mark (identifier) 225 while the audio data of an arbitrary speaker is played back, the file list display 251 provided with the star marks shown in FIG. 12 may display the number of audio data items of the selected speaker and an approximate position of the recording time of each audio data item relative to the total time (in other words, where in the total time audio data item is recorded).

Figure 13:
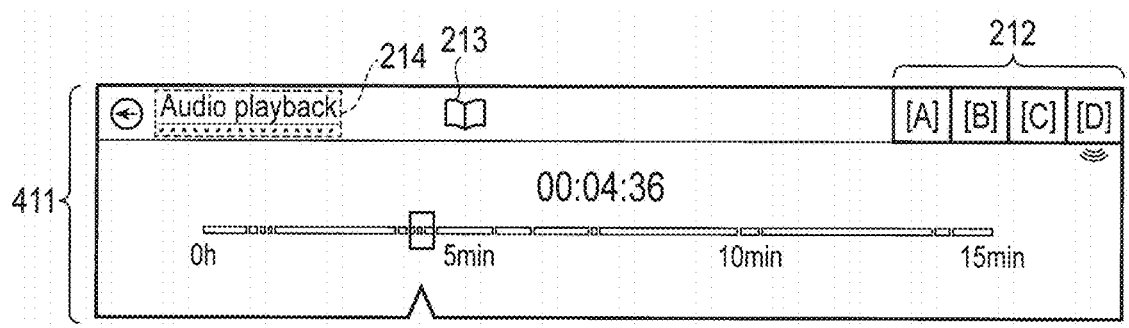
FIG. 13 shows an example of a display example of the screen display of an operation of an audio data display screen in a state where the audio playback program according to an embodiment.

FIG. 13 is a display example of the time bar displayed on the playback-in-progress screen. In this display example, the entire time displayed in the first display area 411 exemplarily shown in FIG. 9, FIG. 10 or FIG. 11 is a quarter of an hour (15 minutes). As shown in FIG. 13, the display range of the time bar 211 is changed with regard to the utterance of the speaker played back in the current playback position 224 in FIG. 9 (specifically, with regard to the utterance of utterance bar 222d and speaker identification display [D] 223d). In this manner, the playback position of audio data displayed by one corresponding utterance bar can be displayed in more detail. In the enlarged view, the display width (in other words, the entire lateral width) of the whole enlarged part indicates approximately 30 seconds.

Figure 14:
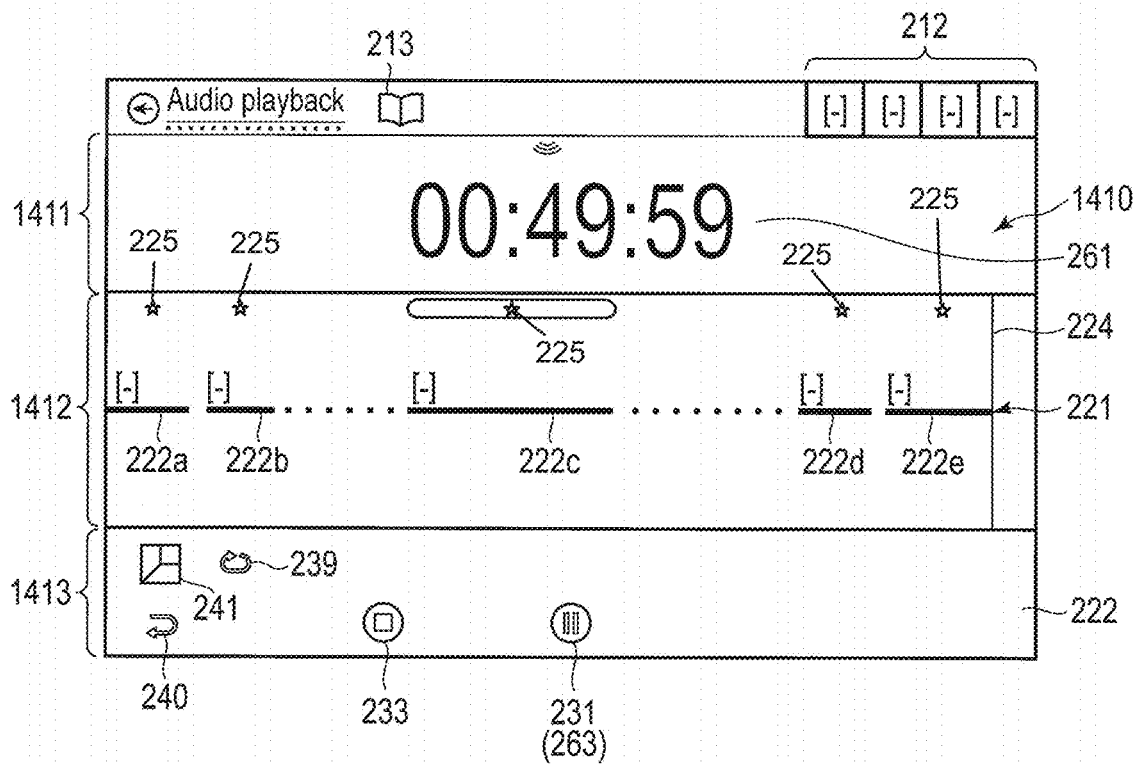
FIG. 14 shows an example of a display example of the screen display of an operation of an audio data display screen in a state where the audio playback program according to an embodiment.

The recording-in-progress screen display 210-2 shown in FIG. 8B or a recording-in-progress screen display 1410 shown in FIG. 14 does not have a time bar display or a locator display in a first display area 1411, and displays the recording time (elapsed time) in a recording time display portion display 210-21 (261 in FIG. 14). Because no speaker determination is applied by the speaker determination module 323 with regard to recording, an image signal (display signal) for performing a display indicating that the current operation is different from playback, such as "-", . . . , "-", is preferably output and displayed in the speaker display area 212 for displaying speakers as the output from the feedback process module 330. The list display button 213 for displaying the field of list display 227 capable of displaying a list of stored audio data items, in other words, a list of recorded data items, is displayed at a predetermined position.

In a second display area 1412, only partial information which is analyzable in real time even during recording is displayed; for example, the results of detection of voice zones (utterance bars) 222a to 222n are displayed. Since speaker determination is not applied by the speaker determination module 323, the display regarding speaker identification is preferably performed to only show that voice zones were detected through, for example, [-], . . . , [-] 223a to 223n. The current position mark (line) 224 indicating the current recording time (position) is preferably moved to a predetermined position in the right part of the display field 221 in comparison with the position during playback.

The marking identifier (star mark) 225 is displayed near substantially the central portion of each of utterance bars 222a to 223n in the length (time) direction. Each utterance during recording can be marked by tapping the vicinity of the star mark 225.

A third display area 1413 includes, for example, the pause button 231/a recording button 262, the stop button 233 and the return button 240. The third display area 413 includes the display switch button 241 which allows the user to input an instruction for switching the display style of the screen display 210 with the snap view screen exemplarily shown in FIG. 15. The pause button 231 and the recording button 262 are alternately displayed on a toggle basis in accordance with each touch or tap. The recording of utterance of the current speaker is started by touching or tapping the recording button 262. In a state where the utterance of the current speaker is recorded by the recording button 262, the pause button 231 is displayed. When the pause button 231 is touched or tapped, recording is temporarily stopped, and the recording button 232 is displayed.

Figure 15:
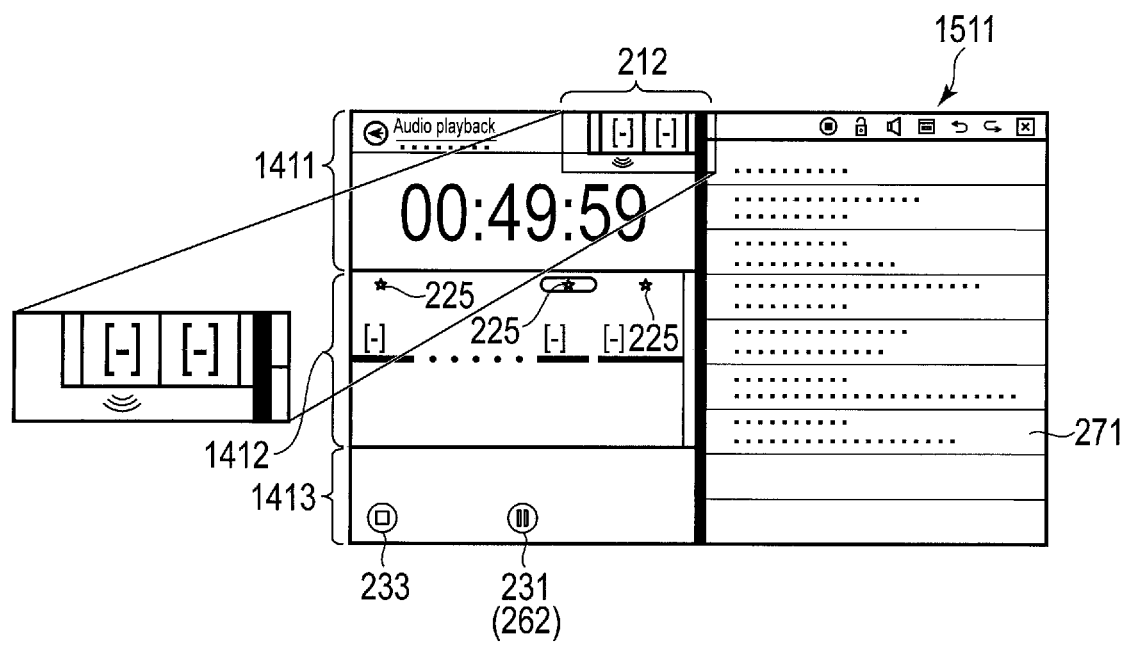
FIG. 15 shows an example of a display example of the screen display of an operation of an audio data display screen in a state where the audio playback program according to an embodiment.

In the snap view screen display exemplarily shown in FIG. 15, the first display area 1411 to the third display area 1413 are displayed in one of two right and left split displays of a screen display 1511 as shown in the screen display 1511. A snap view screen 271 is displayed at which a remaining the one of the right and left split display of the screen display 1511. For example, the snap view screen 271 is capable of displaying the start time and the end time of each of the specified voice zones in order.

In the snap view screen display, when the number of detected voice zones is not fitted into the display area in the voice zone area 1412 in the field of entire view/time-line and guide (the first display area) 1411, it is possible to use a ticker display which cuts a part of the detected zones in order to prompt scrolling (a ticker method, which passes a character string through a specific range (or sequentially changes the display position of a character in one direction) in display). In this manner, it is possible to notify the user that the number of recorded voice zones is greater than the number of displays in the voice zone area 1412.

Figure 16:
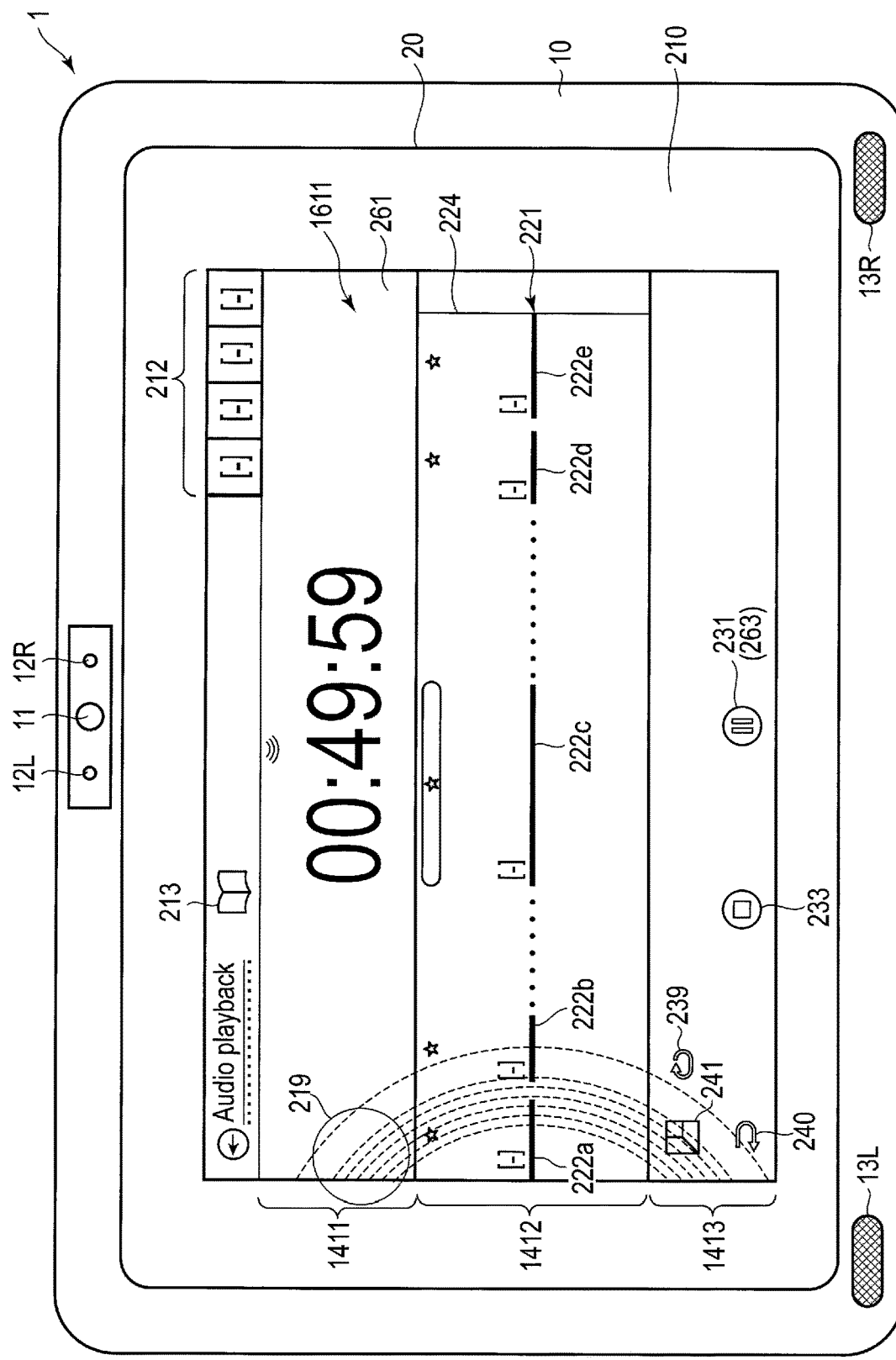
FIG. 16 shows an example of a display example of the screen display of an operation of an audio data display screen in a state where the audio playback program according to an embodiment.

FIG. 16 shows another example of the screen display during recording. For example, a speaker direction mark 219 may be displayed within the screen display 210. The speaker direction mark 219 indicates the result of estimation of the direction in which the voice/sound is input, in other words, the direction in which the speaker is present. Thus, the direction in which the speaker of the detected voice is present may be displayed.

With regard to the voice zones shown in FIG. 14 to FIG. 16, statistical analysis (clustering analysis) is applied to all of the recorded data items at a predetermined time point after the end of recording. Thus, the speaker is specified. The specified speaker is updated in the speaker display during playback.

Figure 17:
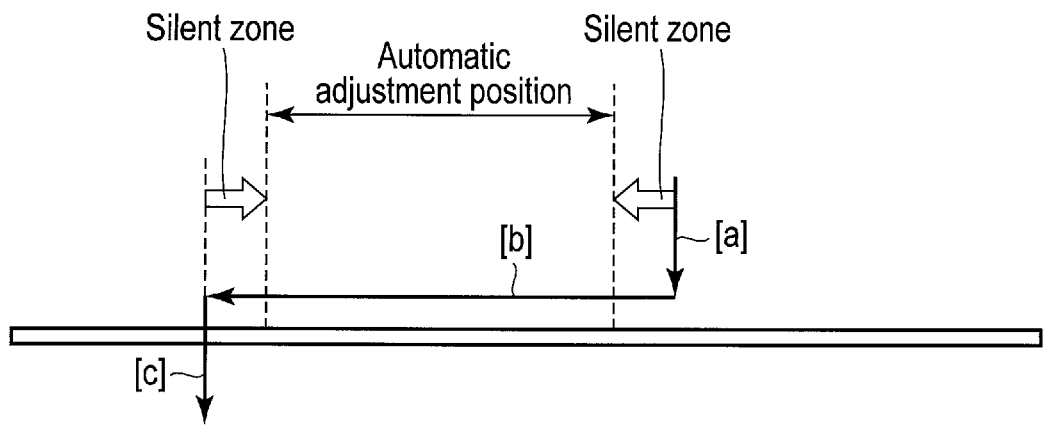
FIG. 17 shows an example of the outline of the deletion for silent zone with an automatically adjusting the data playback of a partial zone of recorded audio data according to an embodiment.
Figure 18:
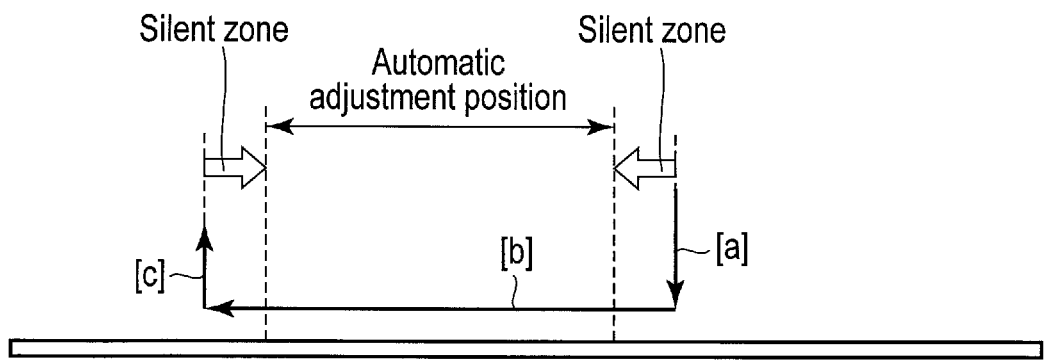
FIG. 18 shows an example of the outline of the cutout (trimming) of a partial zone from recorded audio data according to an embodiment.

The audio data which is stored and recorded can be edited as shown in FIG. 17 or FIG. 18 by using the silent zones detected by the playback start position adjustment module 322 of the audio playback program 202. FIG. 17 shows an example of deletion of a partial zone of recorded audio data. FIG. 18 shows an example of cutout (trimming) of necessary information from audio data. In the editing shown in FIG. 17 or FIG. 18, the head of the target audio data can be easily set.

For example, as shown in FIG. 17, a partial zone of recorded audio data can be deleted by movements (instruction inputs) [a] to [c] of the locator 211a (see FIG. 4) located at a predetermined position of the time bar 211 shown in FIG. 4 with a finger of the user.

The first gesture of the user's finger relative to the locator 211a of the time bar 211 is detected. For example, a gesture from a direction orthogonal to the extension direction of the time bar 211 to the time bar 211 is detected [a].

Subsequently, movement (the second gesture) of the locator 211 on the time bar 211 with the user's finger is determined as the setting gesture of the target zone [b].

Subsequently, the processing content input by the user as an instruction is specified based on the direction of movement (the third gesture) of the user's finger [c].

For example, when the direction of movement of the user's finger is substantially orthogonal to the direction of movement of the finger for setting the target zone by movement [b], and further, the direction of movement is a direction toward the base bottom portion of the image (time bar) displayed on the display surface of the touchpanel 22 (in other words, toward the bottom of the erect screen display), the operation is determined as deletion.

At this time, the above automatic adjustment can be applied to each of the first gesture [a] of the user's finger and the end position [b] of the second gesture of the user's finger specified by the third gesture of the user's finger.

When the user deletes the data of a partial zone of audio data displayed on the axis of time base, the user can easily set the zone of audio data to be deleted to the range from the silent zone at the head of a voice zone to the silent zone at the tail of the voice zone by merely and roughly instructing (inputting) the deletion start position (the head of the voice zone) and the deletion end position (the tail of the voice zone) on the time bar 211 displayed on the touchpanel 22. In this manner, when a partial zone of recorded audio data is deleted, the deletion zone can be intuitively set.

FIG. 18 shows an example in which the cutout (trimming) of a partial zone (necessary information) from recorded audio data is performed by movements (instruction inputs) [a] to [c] of the locator 211a (see FIG. 4) located at a predetermined position of the time bar 211 shown in FIG. 4 with a finger of the user.

The first gesture of the user's finger relative to the locator 211a of the time bar 211 is detected. For example, a gesture from a direction orthogonal to the extension direction of the time bar 211 to the time bar 211 is detected [a].

Subsequently, movement (the second gesture) of the locator 211 on the time bar 211 with the user's finger is determined as the setting gesture of the target zone [b].

Subsequently, the processing content input by the user as an instruction is specified based on the direction of movement (the third gesture) of the user's finger [c].

For example, when the direction of movement of the user's finger is substantially orthogonal to the direction of movement [b] of the finger for setting the target zone, and further, the direction of movement is a direction toward the upper portion of the image (time bar) displayed on the display surface of the touchpanel 22 (in other words, toward the top of the erect screen display), the operation is defined as cutout (trimming).

At this time, the above automatic adjustment can be applied to each of the first gesture [a] of the user's finger and the end position [b] of the second gesture of the user's finger specified by the third gesture of the user's finger.

When the user cuts out (trims) the data of a partial zone of audio data displayed on the axis of time base, the user can easily set the zone of audio data to be cut out (trimmed) to the range from the silent zone at the head of a voice zone to the silent zone at the tail of the voice zone by merely and roughly instructing (inputting) the head (the start position) and the tail (the end position) of the target voice zone on the time bar 211 displayed on the touchpanel 22.

In this manner, the target zone for cutout (trimming) of necessary information from recorded audio data can be intuitively set.

In the above processing example shown in FIG. 17 or FIG. 18, it is possible to cut out and store all of the utterances of the same speaker (in other words, a plurality of audio data items of the same speaker in which determined zones are different) in association with the speaker specification explained below. In this case, for example, a user interface (UI) screen is preferably displayed in order to allow the user to select an instruction input regarding whether only the audio data of the specified zone should be stored or all of the audio data items related to the same speaker should be stored.

In the above embodiment, apart from the operation of the locator on the time bar, automatic adjustment is preferably performed such that audio data is played back from the head of the utterance zone whose speaker is identified in accordance with the display range of the time bar in a case of recorded audio content which displays the result of speaker identification.

In the above embodiment, apart from the operation of the locator on the time bar, automatic adjustment is preferably applied to the playback position by buffering audio data near the seek position and performing zone determination in accordance with the display range of the time bar in a case of recorded audio content which displays the result of speaker identification.

In the above embodiment, apart from the operation of the locator on the time bar, it is desirable that automatic adjustment should not be performed in accordance with the display range of the time bar in a case of recorded audio content which displays the result of speaker identification.

In the above embodiment, the display range of the time bar is preferably switched by a zoom-in/zoom-out operation.

In the above embodiment, a zoom-in/zoom-out operation is preferably performed by a pinch-in/pinch-out in addition to a normal button when the user inputs an instruction through the touchpanel.

In the above embodiment, in a manner similar to that of the case of editing explained in FIG. 17 and FIG. 18, automatic adjustment is preferably performed by buffering audio data near the specified position and applying zone determination in the range specification when an editing operation such as the cutout of an audio file is performed apart from the operation of the locator on the time bar. In this case, a flick is preferably available as an instruction input for the trimming (cutout and storage) and the deletion of a zone in an editing operation when the user inputs an instruction through the touchpanel.

Now, this specification further explains the operation of the audio playback program 202 and image display corresponding to the display surface of the touchpanel 22.

The specification of the audio playback program 202 is explained below.

Examples of screen displays which are performed when the audio playback program 202 is operated as explained with reference to FIG. 4, FIG. 8A, FIG. 8B, FIG. 8C, and FIG. 9 to FIG. 16, and a function corresponding to each display are as follows.

[Before recording]
[Main screen]
[Display of a list of recorded files]
A list of recorded files is displayed.
  File title (Meeting title)
  Recording date
    (yyyy/mm/dd)
      (hh:mm:ss-hh:mm:ss)
  Recording time (hh:mm:ss)
  File protect mark
[Sharing of recorded file]
Recorded files can be shared.
[Input of meeting title]
A meeting title can be input in advance before recording is started.
[Display of application bar]
An application bar is displayed at a predetermined position of the lower part of the display screen.
[New recording button]
Recording is started.
[Display of remaining recordable time]
Recordable time is displayed based on the remaining storage amount (hh:mm:ss).
[Sort]
Recorded files can be sorted in the following items.
  by created date and time in reverse chronological order/chronological order
  by titles
  by the number of participants in descending order/ascending order
[Display of explanation of use method]
The explanation of use method is displayed.
[Display of enlarged view]
A display bar is displayed in a line form such that the switch of speaker can be recognized in real time.
[Application bar]
[Deletion (of selected file)]
A recorded file (selected recorded file) is deleted.
[Selection of file]
A list of recorded files is displayed in selection mode.
[Export]
A selected file is exported to a predetermined folder.
[Editing]
Recorded files can be edited in the following items.
  Meeting title
  The number of participants

[Cancellation of selection]
The selection of a selected file is canceled.
[Playback]
A selected file is played back.
[Select all]
All of recorded files are selected.
[Others]
[Cancellation of tablet operation sound (on/off)]
A toggle button system is applied such that on/off is changed alternately.
The sound of a stylus or a keyboard is prevented.
[Noise removal (on/off)]
A toggle button system is applied such that on/off is changed alternately.
The sound of air-conditioning or the sound of the fan of the computer is prevented.
[Pre-recording (on/off)]
Recording is applied retroactively to data before the recording start button is pressed.
[Microphone gain control (auto/manual)]
A toggle button system is applied such that auto/off is changed alternately.
Automatic adjustment can be set for microphone gain.
[Help]
A help file is displayed.
[Version information]
The version of the application is displayed.
[During recording]
[Main screen]
[Display of meeting title]
The meeting title determined on the screen before recording is displayed.
[Additional writing and correction of meeting title]
The meeting title can be edited.
[Display of meeting participants]
Participants are displayed in alphabets.
[Display of star mark]
By tapping a star mark, the applicable utterance zone is marked.
[Stop by stop button]
Recording is stopped.
After stopping recording, the display is transitioned to the before-recording screen.
[Pause of recording by recording button]
Recording is temporarily stopped.
[Restart of recording by recording button]
Recording is restarted.
[Automatic stop when the remaining recordable time is less]
　When the remaining recordable time is less, recording is automatically stopped.
　　Before recording is automatically stopped, the user is notified of the stop of recording in a pop-up manner
[User notification (toast)]
User notification is performed in the following operations.
　when the remaining recordable time is less
　　while recording is performed in background (The message of "recording in progress" and the recording time are displayed regularly)
[Screen for confirmation and selection of the number of participants of meeting]
　Selected by the user when recording has been finished.
　　Utterance of two to three people
　　Utterance of three to five people
　　Utterance of six or more people
[Display of elapsed recording time]
The elapsed recording time is displayed (hh:mm:ss).

[Display of enlarged view]
The speakers are displayed in alphabets in an enlarged view.
[Application bar]
[Editing]
The meeting title and the number of participants can be edited.
[Snap display]
[Display of participants of meeting]
The participants of meeting are shown in alphabets.
[Background]
[Notified by toast regularly]
Notification is made regularly to prevent the user from forgetting to stop recording.
[During playback]
[Main screen]
[Display of meeting title]
The meeting title is displayed.
[Additional writing and editing of meeting title]
The meeting title can be additionally written or edited.
[Display of participants of meeting]
The participants of meeting are displayed in alphabets.
[Play button]
Playback is started.
[Pause of playback]
Playback is temporarily stopped.
[Stop by stop button]
Stop is applied.
The file can be closed after the stop by setting.
[Slow-speed play button]
The slow-speed play button applies slow-speed playback (0.5 times or 0.75 times slower than normal).
[High-speed play button]
The high-speed play button applies high-speed playback (1.25 times, 1.5 times, 1.75 times or twice as fast as normal).
[Button for selection from a list of star marks]
A list of files of star marks is displayed.
[Star mark skip button]
A star mark is skipped for playback.
[Display of time of playback position]
The time of the playback position is displayed.
[Display of recording time]
The recording time is displayed.
[Display of skip button]
The current position is jumped to the previous or next utterance zone by a button operation.
[Display of repeat button]
Repeat playback is applied by a button operation.
[Return button]
The display returns to the recording start screen.
[Display of only specific speaker]
The utterance of the specific speaker is played back on the following conditions.
　Only the utterance of the participant selected from the enlarged view is displayed
　Only the utterance of the specific speaker is played back (More than one speaker can be selected)
[Time scale]
The scale for displaying the actual time is displayed.
[Display of seek bar (locator) relative to utterance during playback]
　The current playback position is displayed.
[Scrolling (move) of seek bar (locator) relative to utterance during playback]
　The scrolled (moved) playback position is sought.

[Display of entire view]
The whole part of recorded content is displayed.
[Fine adjustment of playback position]
The playback position of the entire view is adjusted by a swipe operation.
[Enlarged display frame of playback portion]
An enlarged frame indicating the vicinity of the current playback portion is displayed.
[Display of enlarged view]
The speakers are displayed in alphabets in an enlarged view.
[Display of star mark]
By tapping a star mark, the applicable utterance zone can be marked.
[Export of star mark]
A star mark is selected from the displayed list of star marks and is exported.
[Application bar]
[Silent zone skip (on/off)]
The on/off of skip of silent zones is set.
[Playback of only specific speaker]
Only the utterance of the specific speaker is played back.
[Editing]
The meeting title and the number of participants can be edited.
[Snap display]
[Display of participants of meeting]
The participants of meeting are shown in alphabets.
[Others]
[Screen rotation]
Conforming to landscape/portrait mode.
[Background recording]
Even if the application is transitioned to the background, recording continues.
[Scaling of snap screen]
Snap display is applied to the application.

In this manner, according to the present embodiment, when the user plays back content including sound/audio signals, the time bar and the locator are displayed with a playback image. When the playback position is arbitrarily sought by moving the locator, the playback start position of the sound/audio signals can be automatically adjusted to the gaps of the sound/audio signals.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a screen;
a microphone configured to capture sound and produce audio data; and
a hardware processor that:
records the audio data in a storage medium to obtain recorded audio data, the audio data comprising a first utterance by a first user and a second utterance by a second user;
plays back the recorded audio data;
displays, on a recording display screen while the audio data is being recorded, a first utterance bar for capturing the first utterance by the first user, the first utterance bar having a length corresponding to a first recording time of the first utterance by the first user, a first speaker identifier corresponding to the first user, a second utterance bar for capturing the second utterance by the second user, the second utterance having a length corresponding to a second recording time of the second utterance by the second user, and a second speaker identifier corresponding to the second user;
displays an audio play back screen to play back the recorded audio data;
displays, on the audio play back screen:
a seek bar corresponding to the audio data having a length corresponding to a total time of the audio data, and the audio data represented by the seek bar comprising the first utterance by the first user and the second utterance by the second user,
a locator on the seek bar, indicating a current playback position of the audio data on the seek bar,
a third utterance bar near the seek bar, the third utterance bar having a length corresponding to the length of the first utterance bar,
a first speaker identifier corresponding to the third utterance bar,
a fourth utterance bar near the seek bar and in vicinity to the third utterance bar, the fourth utterance bar having a length corresponding to the length of the second utterance bar, and
a second speaker identifier corresponding to the fourth utterance bar,
while the recorded audio data is played back, the locator is moving along the seek bar relative to the seek bar to set the current playback position of the audio data, and a start position of audio playback can be adjusted to a time point where the locator indicates on the seek bar;
while the locator is moving along the seek bar to play back the audio data, displays, on the audio play back screen, a current position identifier moving along the third or the fourth utterance bar relative to the third or the fourth utterance bar according to the changing current playback position of the locator moving along the seek bar, the current position identifier indicates the audio data of which utterance bar is currently played back,
when the current position identifier is moving along the third utterance bar, the current position identifier indicates a current audio playback position of the first utterance by the first user; and
when the current position identifier is moving along the fourth utterance bar, the current position identifier indicates a current audio playback position of the second utterance by the second user.

2. The electronic device of claim 1, wherein the hardware processor displays, on the screen, an identifier indicative of which utterance included in the audio data is played back, while the recorded audio data is played back.

3. The electronic device of claim 2, wherein the hardware processor displays, on the screen, data for identifying the first user in association with the third utterance bar and data for identifying the second user in association with the fourth utterance bar.

4. The electronic device of claim 1, wherein the hardware processor
stops, when the second utterance follows the first utterance and a first operation is performed during playback of the first utterance, the playback of the first utterance and start playback of the second utterance in accordance with the first operation; and
stops, when the second utterance follows the first utterance and a second operation is performed during playback of the second utterance, the playback of the second utterance and start playback of the first utterance in accordance with the second operation.

5. A method performed by an electronic device, the method comprising:
capturing sound by a microphone to produce audio data;
recording the audio data in a storage medium to obtain recorded audio data, the audio data comprising a first utterance by a first user and a second utterance by a second user;
playing back the recorded audio data;
displaying, on a recording display screen while the audio data is being recorded, a first utterance bar for capturing the first utterance by the first user, the first utterance bar having a length corresponding to a first recording time of the first utterance by the first user, a first speaker identifier corresponding to the first user, a second utterance bar for capturing the second utterance by the second user, the second utterance having a length corresponding to a second recording time of the second utterance by the second user, and a second speaker identifier corresponding to the second user;
displaying an audio play back screen to play back the recorded audio data;
displaying, on the audio play back screen:
a seek bar corresponding to the audio data having a length corresponding to a total time of the audio data, and the audio data represented by the seek bar comprising the first utterance by the first user and the second utterance by the second user,
a locator on the seek bar, indicating a current playback position of the audio data on the seek bar,
a third utterance bar near the seek bar, the third utterance bar having a length corresponding to the length of the first utterance bar,
a first speaker identifier corresponding to the third utterance bar,
a fourth utterance bar near the seek bar and in vicinity to the third utterance bar, the fourth utterance bar having a length corresponding to the length of the second utterance bar, and
a second speaker identifier corresponding to the fourth utterance bar,
while the recorded audio data is played back, the locator is moving along the seek bar relative to the seek bar to set the current playback position of the audio data, and a start position of audio playback can be adjusted to a time point where the locator indicates on the seek bar;
while the locator is moving along the seek bar to play back the audio data, displaying, on the audio play back screen, a current position identifier moving along the third or the fourth utterance bar relative to the third or the fourth utterance bar according to the changing current playback position of the locator moving along the seek bar, the current position identifier indicates the audio data of which utterance bar is currently played back,
when the current position identifier is moving along the third utterance bar, the current position identifier indicates a current audio playback position of the first utterance by the first user; and
when the current position identifier is moving along the fourth utterance bar, the current position identifier indicates a current audio playback position of the second utterance by the second user.

6. The method of claim 5, further comprising:
displaying an identifier indicative of which utterance included in the audio data is played back while the recorded audio data is played back.

7. The method of claim 6, further comprising:
displaying data for identifying the first user in association with the third utterance bar, and
displaying data for identifying the second user in association with the fourth utterance bar.

8. The method of claim 5, further comprising:
stopping, when the second utterance follows the first utterance and a first operation is performed during playback of the first utterance, the playback of the first utterance and starting playback of the second utterance in accordance with the first operation, and
stopping, when the second utterance follows the first utterance and a second operation is performed during playback of the second utterance, the playback of the second utterance and starting playback of the first utterance in accordance with the second operation.

9. A non-transitory computer readable recording medium comprising a program, the program when executed by a computer causes the computer to:
capture sound by a microphone to produce audio data;
record the audio data in a storage medium to obtain recorded audio data, the audio data comprising a first utterance by a first user and a second utterance by a second user;
play back the recorded audio data;
display, on a recording display screen while the audio data is being recorded, a first utterance bar for capturing the first utterance by the first user, the first utterance bar having a length corresponding to a first recording time of the first utterance by the first user, a first speaker identifier corresponding to the first user, a second utterance bar for capturing the second utterance by the second user, the second utterance having a length corresponding to a second recording time of the second utterance by the second user, and a second speaker identifier corresponding to the second user;
display an audio play back screen to play back the recorded audio data;
display, on the audio play back screen:
a seek bar corresponding to the audio data having a length corresponding to a total time of the audio data, and the audio data represented by the seek bar comprising the first utterance by the first user and the second utterance by the second user,
a locator on the seek bar, indicating a current playback position of the audio data on the seek bar,
a third utterance bar near the seek bar, the third utterance bar having a length corresponding to the length of the first utterance bar,
a first speaker identifier corresponding to the third utterance bar, a fourth utterance bar near the seek bar and in vicinity to the third utterance bar, the fourth utterance bar having a length corresponding to the length of the second utterance bar, and a second speaker identifier corresponding to the fourth utterance bar, while the recorded audio data is played back, the locator is moving along the seek bar relative to the seek bar to set the current playback position of the audio data, and a start position of audio playback can be adjusted to a time point where the locator indicates on the seek bar;

while the locator is moving along the seek bar to play back the audio data, display, on the audio play back screen, a current position identifier moving along the third or the fourth utterance bar relative to the third or the fourth utterance bar according to the changing current playback position of the locator moving along the seek bar, the current position identifier indicates the audio data of which utterance bar is currently played back, when the current position identifier is moving along the third utterance bar, the current position identifier indicates a current audio playback position of the first utterance by the first user; and when the current position identifier is moving along the fourth utterance bar, the current position identifier indicates a current audio playback position of the second utterance by the second user.

10. The recording medium of claim 9, wherein the program further causes the computer to:
display an identifier indicating which utterance included in the audio data is played back while the recorded audio data is played back.

11. The recording medium of claim 10, wherein the program causes the computer to:
display data for identifying the first user in association with the third utterance bar; and
display data for identifying the second user in association with the fourth utterance bar.

12. The recording medium of claim 9, wherein the program causes the computer to:
stop, when the second utterance follows the first utterance and a first operation is performed during playback of the first utterance, the playback of the first utterance and start playback of the second utterance in accordance with the first operation; and
stop, when the second utterance follows the first utterance and a second operation is performed during playback of the second utterance, the playback of the second utterance and start playback of the first utterance in accordance with the second operation.

* * * * *